(12) United States Patent
Yuan et al.

(10) Patent No.: US 12,536,704 B2
(45) Date of Patent: Jan. 27, 2026

(54) LIGHT FIELD IMAGE PROCESSING METHOD, LIGHT FIELD IMAGE ENCODER AND DECODER, AND STORAGE MEDIUM

(71) Applicant: GUANGDONG OPPO MOBILE TELECOMMUNICATIONS CORP., LTD., Dongguan (CN)

(72) Inventors: Hui Yuan, Dongguan (CN); Congrui Fu, Dongguan (CN); Ming Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 497 days.

(21) Appl. No.: 18/079,174

(22) Filed: Dec. 12, 2022

(65) Prior Publication Data
US 2023/0106939 A1   Apr. 6, 2023

Related U.S. Application Data

(63) Continuation of application No. PCT/CN2020/103177, filed on Jul. 21, 2020.

(51) Int. Cl.
*H04N 19/597*   (2014.01)
*G06T 3/4046*   (2024.01)
(Continued)

(52) U.S. Cl.
CPC .............. *G06T 9/00* (2013.01); *G06T 3/4053* (2013.01); *G06T 5/50* (2013.01); *G06V 10/7715* (2022.01);
(Continued)

(58) Field of Classification Search
CPC .......... G06T 9/00; G06T 3/4053; G06T 5/50; G06T 2200/21; G06T 2207/10021;
(Continued)

(56) References Cited

U.S. PATENT DOCUMENTS 5,535,138 A * 7/1996 Keith .................. H04N 19/149
709/247
2019/0387211 A1   12/2019 Drazic et al.

FOREIGN PATENT DOCUMENTS

CN   104469372 A   3/2015
CN   106254719 A   12/2016
(Continued)

OTHER PUBLICATIONS

Zhao, Light Field Image Compression via CNN-Based EPI Super-Resolution and Decoder-Side Quality Enhancement, IEEE Access, date of publication Jul. 23, 2019 (Year: 2019).*
(Continued)

*Primary Examiner* — Vu Le
*Assistant Examiner* — Lei Zhao
(74) *Attorney, Agent, or Firm* — BAYES PLLC

(57) ABSTRACT

A light field image processing method, a light field image encoder and decoder, and a storage medium are provided. The light field image processing method includes: a light field image decoder parsing a code stream, so as to obtain an initial sub-aperture image; inputting the initial sub-aperture image into a super-resolution reconstruction network, and outputting a reconstructed sub-aperture image, wherein the spatial resolution and the angular resolution of the reconstructed sub-aperture image are both greater than the spatial resolution and the angular resolution of the initial sub-aperture image; and inputting the reconstructed sub-aperture image into a quality enhancement network, and outputting a target sub-aperture image.

18 Claims, 11 Drawing Sheets

(51) Int. Cl.
  *G06T 3/4053* (2024.01)
  *G06T 5/50* (2006.01)
  *G06T 9/00* (2006.01)
  *G06V 10/77* (2022.01)
  *H04N 19/172* (2014.01)

(52) U.S. Cl.
  CPC .................. *G06T 2200/21* (2013.01); *G06T 2207/10021* (2013.01); *G06T 2207/10052* (2013.01)

(58) Field of Classification Search
  CPC ........ G06T 2207/10052; G06T 3/4046; G06V 10/7715; H04N 19/597; H04N 19/172
  See application file for complete search history.

(56) References Cited

FOREIGN PATENT DOCUMENTS

| CN | 107027025 A | 8/2017 | |
| CN | 109447919 A | 3/2019 | |
| CN | 110191344 A | 8/2019 | |
| CN | 110191359 A | 8/2019 | |
| CN | 110599400 A | 12/2019 | |
| EP | 1837826 A1 * | 9/2007 | ........... G06T 3/4007 |
| WO | 2018050725 A1 | 3/2018 | |

OTHER PUBLICATIONS

Meng, High-Dimensional Dense Residual Convolutional Neural Network for Light Field Reconstruction, IEEE Transactions on Pattern Analysis and Machine Intelligence, vol. 43, No. 3, Mar. 2021, date of publication Oct. 1, 2019 (Year: 2019).*

Sengyang Zhao, Light Field Image Coding via Linear Approximation Prior, 2017 IEEE International conference on image processing (ICIP), 2017 (Year: 2017).*

Ma Xiaohui, et al., "Light Field Image Compression Based on Multi-view Pesudo Sequence", Journal of Signal Processing, vol. 35 No. 3, Mar. 31, 2019, pp. 378-385.

International Search Report in the international application No. PCT/CN2020/103177, mailed on Apr. 21, 2021.

English translation of the Written Opinion of the International Search Authority in the international application No. PCT/CN2020/103177, mailed on Apr. 21, 2021.

Nan Meng et al: "High-dimensional Dense Residual Convolutional Neural Network for Light Field Reconstruction", Arxiv. Org, Cornell University Library, 201 Olin Library Cornell University Ithaca, NY 14853, Oct. 3, 2019 (Oct. 3, 2019), DOI: 10.1109/TPAMI.2019.2945027. 14 pages.

Andre Ivan et al: "Joint Spatial and Angular Super-Resolution from a Single Image", Arxiv. Org, Cornell University Library, 201 Olin Library Cornell University Ithaca, NY 14853, Jun. 27, 2020 (Jun. 27, 2020), DOI: 10.1109/ACCESS.2020.3002921. 13 pages.

Zhao Jinbo et al: "Light Field Image Compression via CNN-Based EPI Super-Resolution and Decoder-Side Quality Enhancement", IEEE Access, vol. 7, Jul. 23, 2019, pp. 135982-135998, DOI: 10.1109/ACCESS.2019.2930644. 17 pages.

Jonathan Samuel Lumentut et al: "Fast and Full-Resolution Light Field Deblurring using a Deep Neural Network", Arxiv. Org, Cornell University Library, 201 Olin Library Cornell University Ithaca, NY 14853, Mar. 31, 2019 (Mar. 31, 2019), arXiv: 1904.00352v1. 9 pages.

Wu Gaochang et al: "Light Field Reconstruction Using Deep Convolutional Network on EPI", 2017 IEEE Conference on Computer Vision and Pattern Recognition (CVPR), IEEE Computer Society, US, Jul. 21, 2017 (Jul. 21, 2017), pp. 1638-1646, ISSN: 1063-6919, DOI: 10.1109/CVPR.2017.178. 9 pages.

Supplementary European Search Report in the European application No. 20946182.1, mailed on May 10, 2023. 12 pages.

* cited by examiner

Raster scanning

Rotation scanning

Zigzag-shaped scanning

U-shaped scanning

LIGHT FIELD IMAGE PROCESSING METHOD, LIGHT FIELD IMAGE ENCODER AND DECODER, AND STORAGE MEDIUM

CROSS-REFERENCE TO RELATED APPLICATION

The present disclosure is a continuation application of International Application No. PCT/CN2020/103177, filed on Jul. 21, 2020. The disclosure of the above application is hereby incorporated by reference in its entirety.

BACKGROUND

The size of a light field picture that is collected by a general camera array or a light field camera is relatively large, so that the light field picture is often required to be compressed to save storage space. Currently, a compression solution for the light field picture may mainly include a picture-based direct compression method and a pseudo video sequence-based indirect compression method.

A current encoding and decoding standard is mainly applied to the processing of general pictures, so that the effect of directly using the current encoding and decoding standard to process the light field picture is not ideal. Meanwhile, the indirect compression method of converting the light field picture into a Sub Aperture Image (SAI) and then performing process may greatly increase computational complexity and is low in processing accuracy.

It can be seen that, for the compression solution for the light field picture, high-efficiency and high-accuracy processing cannot be performed on a current encoding and decoding standard technology.

SUMMARY

Embodiments of this application relate to an encoding and decoding technology of a light field picture, in particular, to a method for light field picture processing, a light field picture encoder and decoder, and a storage medium.

Embodiments of this application provide a method for light field picture processing, a light field picture encoder and decoder, and a storage medium, so as to reduce transmitted bitstreams, thereby enhancing the efficiency of encoding and decoding.

The technical solutions of the embodiments of this application are implemented as follows.

According to a first aspect, an embodiment of this application provides a method for light field picture processing. The method is applied to a light field picture decoder and includes the following operations.

A bitstream is parsed to obtain an initial Sub Aperture Image (SAI).

The initial SAI is inputted into a super-resolution reconstruction net, and a reconstructed SAI is outputted. The spatial resolution and the angular resolution of the reconstructed SAI are both greater than the spatial resolution and the angular resolution of the initial SAI.

The reconstructed SAI is inputted into a Quality Enhancement Net (QENet), and a target SAI is outputted.

According to a second aspect, an embodiment of this application provides a method for light field picture processing. The method is applied to a light field picture encoder and includes the following operations.

A lenslet image is obtained through collection by a light field camera, and an SAI is generated according to the lenslet image.

Down-sampling processing is performed on the SAI to obtain an initial SAI.

A picture pseudo-sequence corresponding to the SAI is generated based on a preset arrangement order and the initial SAI.

Encoding processing is performed based on the picture pseudo-sequence to generate a bitstream.

According to a third aspect, an embodiment of this application provides a light field picture decoder. The light field picture decoder includes a parsing portion and a first acquisition portion.

The parsing portion is configured to parse a bitstream to obtain an initial SAI.

The first acquisition portion is configured to input the initial SAI into a super-resolution reconstruction net, and output a reconstructed SAI, where the spatial resolution and the angular resolution of the reconstructed SAI are both greater than the spatial resolution and the angular resolution of the initial SAI; and input the reconstructed SAI into a QENet, and output a target SAI.

According to a fourth aspect, an embodiment of this application provides a light field picture decoder. The light field picture decoder includes a first processor, and a first memory that stores instructions executable by the first processor. When the instructions are executed by the first processor, the method for light field picture processing described above is implemented.

According to a fifth aspect, an embodiment of this application provides a light field picture encoder. The light field picture encoder includes a second acquisition portion and a generation portion.

The second acquisition portion is configured to collect a lenslet image by a light field camera.

The generation portion is configured to generate a SAI according to the lenslet image.

The second acquisition portion is further configured to perform down-sampling processing on the SAI to obtain an initial SAI.

The generation portion is further configured to generate a picture pseudo-sequence corresponding to the SAI based on a preset arrangement order and the initial SAI; and perform encoding processing based on the picture pseudo-sequence to generate a bitstream.

According to a sixth aspect, an embodiment of this application provides a light field picture encoder. The light field picture encoder includes a second processor, and a second memory that stores instructions executable by the second processor. When the instructions are executed by the second processor, the method for light field picture processing described above is implemented.

According to a seventh aspect, an embodiment of this application provides a computer-readable storage medium. The computer-readable storage medium stores a program and is applied to a light field picture decoder and a light field picture encoder. When the program is executed by a first processor, the light field picture processing method described in the first aspect is implemented; and when the program is executed by a second processor, the method for light field picture processing described in the second aspect is implemented.

DETAILED DESCRIPTION

Figure 1:
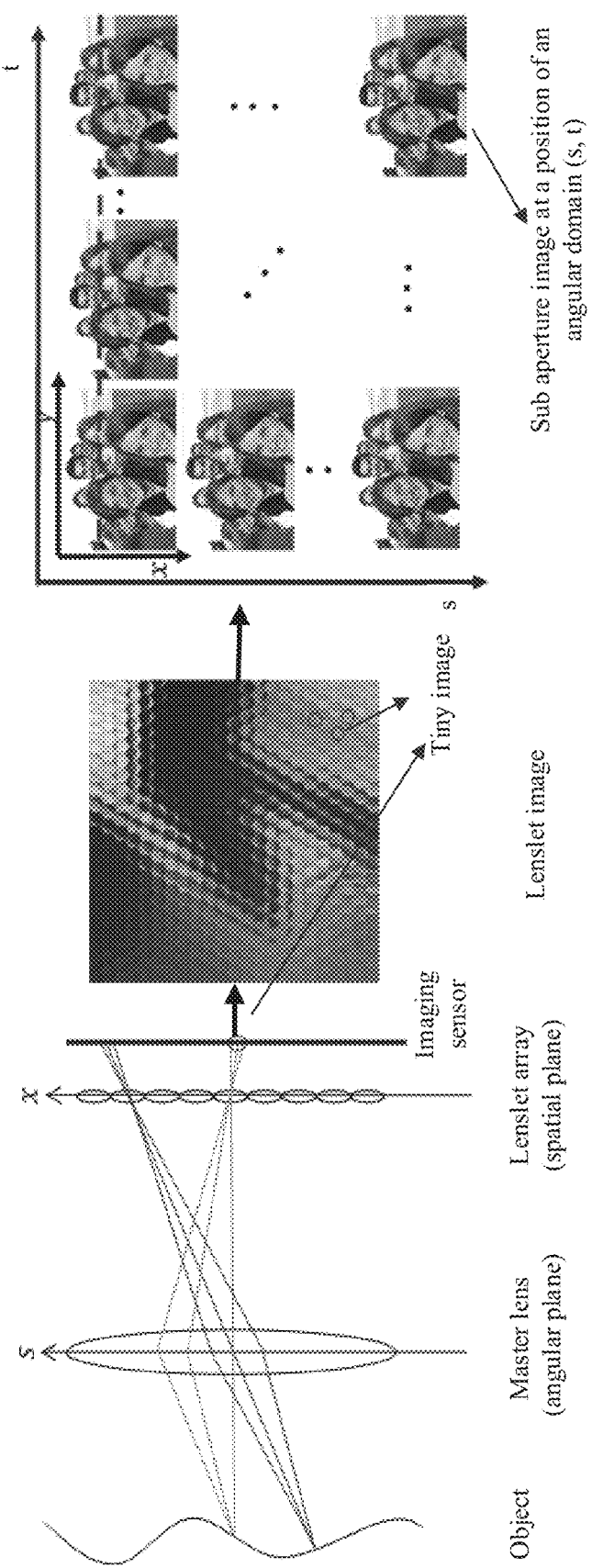
FIG. 1 is a schematic diagram of a light field imaging principle.

The embodiments of this application provide the method for light field picture processing, the light field picture encoder and decoder, and the storage medium. The light field picture decoder parses the bitstream to obtain the initial SAI; the initial SAI is inputted into the super-resolution reconstruction net, and the reconstructed SAI is outputted, where the spatial resolution and the angular resolution of the reconstructed SAI are both greater than the spatial resolution and the angular resolution of the initial SAI; and the reconstructed SAI is inputted into the QENet, and the target SAI is outputted. The light field picture encoder obtains the lenslet image through collection by the light field camera, and an SAI is generated according to the lenslet image; down-sampling processing is performed on the SAI to obtain the initial SAI; the picture pseudo-sequence corresponding to the SAI is generated on the basis of a preset arrangement order and the initial SAI; and encoding processing is performed based on the picture pseudo-sequence to generate the bitstream. That is to say, in the embodiments of this application, since the super-resolution reconstruction net may be used on a decoding end to perform spatial and angular super-resolution reconstruction on a low-resolution SAI, down-sampling processing may be used on an encoding end to reduce the spatial resolution and the angular resolution of the SAI, so that encoding and decoding processing may be performed on only partial light field picture. Therefore, transmitted bitstream data can be effectively reduced, and encoding and decoding efficiency can be greatly enhanced, thereby enhancing the compression efficiency of the light field picture. Therefore, in this application, the design of the super-resolution reconstruction net is used, so that the spatial resolution and the angular resolution of the light field picture can be simultaneously improved. In this way, when the super-resolution reconstruction net is applied to the processing process of light field compression, the efficiency of compression processing can be obviously improved. Meanwhile, in this application, the QENet may also be used to improve the image quality of a result outputted by the super-resolution reconstruction net, so that the picture quality can be improved. To sum up, in this application, before the light field picture encoder compresses and encodes the light field picture, spatial and angular down-sampling processing may be performed on the light field picture, so as to obtain the low-resolution light field picture, so that a data size to be encoded can be reduced. Accordingly, after decoding, the light field picture decoder may use the super-resolution reconstruction net to perform spatial and angular up-sampling processing on the low-resolution light field picture, so as to construct the high-resolution light field picture. Therefore, transmitted bitstreams can be reduced, thereby greatly enhancing the encoding and decoding efficiency.

The technical solutions in the embodiments of this application are clearly and completely described below with reference to the drawings in the embodiments of this application. It is to be understood that, the specific embodiments described here are merely used for explaining related applications rather than limiting this application. In addition, it is further to be noted that, for ease of description, only the parts related to this application are shown in the drawings.

A light field is the sum of light rays at any position in space in any direction. A light field picture may be acquired by the following two methods: collecting by a general camera array or collecting by a light field camera. A two-dimensional array using a two-dimensional image as an element may be acquired by the general camera array, and each picture represents light information at different angles of view. By means of the light field camera, a large-size picture using a macro pixel block as a unit is acquired. Different pixels in the same macro pixel block represent the light information of the same object point at different angles of view.

The light field camera has a similar body as a conventional digital camera, but has a different internal structure. The conventional camera captures the light rays with a master lens, and then focuses the light ray on a film or a photosensor behind the lens. The sum of all light rays forms small dots on a picture, so as to display an image. The light field camera is provided with a microscope array with 90000 micro lenses between the master lens and the photosensor. After receiving the light rays from the master lens, and before transmitting the light rays to the photosensor, each small mirror array precipitates focused light rays, converts light ray data and records the light ray data digitally. The light field camera is internally installed with software to operate "an expanded light field", and traces a drop point of each light ray on an image at different distances, so that a perfect picture can be taken after digital refocusing.

In addition, the light field camera is different from the conventional camera. The aperture and depth of field of the lens are decreased; extra light rays are controlled by using the small mirror array, so as to display the depth of field of each image; then a tiny secondary image is projected on the photosensor, so that hazy diaphragms around all the focused images become "clear"; and increased luminosity, reduced photographing time and graininess resulted by the large aperture of the old camera are maintain, without sacrificing the depth of field and image definition.

FIG. 1 is a schematic diagram of a light field imaging principle. As shown in FIG. 1, compared with the conventional camera, a lenslet array is required to be added in front of a general master lens of the light field camera, so as to capture the light rays in a scenario, and the image can be displayed after performing a series of algorithms on the captured light field picture of an object. The output of an imaging sensor is called a lenslet image, which is composed of many tiny images generated by lenslet. The lenslet image of a spatial domain (x, y) may be converted into a plurality of Sub Aperture Images (SAIs) of an angular domain (s, t) by means of processing, corresponding to different perspective views of the follow-up applications.

Since the size of the light field picture is relatively large, in order to save storage space, the light field picture is usually compressed. Currently, a compression solution for the light field picture may mainly include an image-based direct compression method and a pseudo video sequence-based indirect compression method.

The image-based direct compression method is to directly carry out a current image compression solution, such as a Joint Photographic Experts Group (JPEG), High Efficiency Video Coding (HEVC) and Versatile Video Coding (VVC), on the lenslet image outputted by a sensor.

Figure 2:
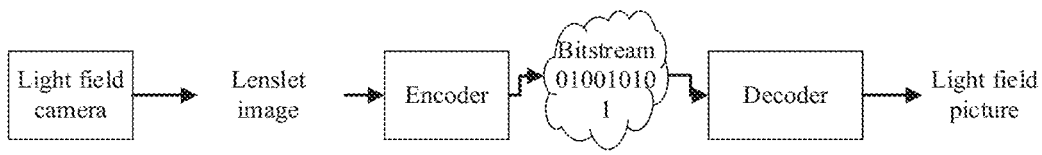
FIG. 2 is a schematic diagram of a direct compression method.

FIG. 2 is a schematic diagram of a direct compression method. As shown in FIG. 2, light field data is collected by using the light field camera, and is outputted as the lenslet image by the sensor. Then, the lenslet image is used as a general natural picture to directly send into a current picture encoding standard such as JPEG, HEVC and VVC for compression; and a bitstream is transmitted to a decoding end. On the decoding end, a corresponding decoding method is used for decoding, so as to reconstruct the light field picture, that is, the lenslet image.

Due to the presence of the lenslet array in the light field camera, the light field lenslet image generates circle-like artifacts, which has characteristics different from a traditional natural picture. The current picture compression solution is mainly designed for the natural picture, and cannot well achieve the efficient compression of the light field picture.

The pseudo video sequence-based indirect compression method is to process the light field picture captured by the light field camera into a plurality of SAIs, then arrange these SAIs as pseudo-sequences according to different sort manners such as a rotation order, a raster scanning order, and a zigzag-shaped and U-shaped scanning order, etc. The current encoding standard is used to perform compression and encoding on the pseudo-sequences.

Figure 3:
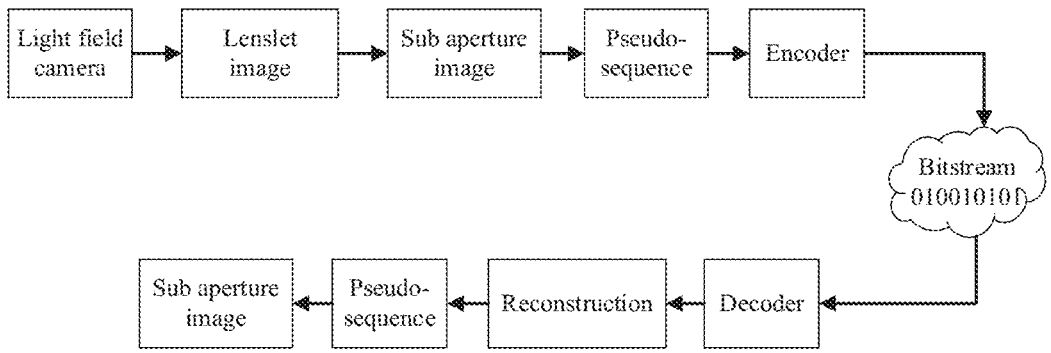
FIG. 3 is a schematic diagram of an indirect compression method.

FIG. 3 is a schematic diagram of an indirect compression method. As shown in FIG. 3, the output of the sensor may be first converted into the SAI and is then compressed. Specifically, the light field lenslet image captured and converted by the lenslet-based light field camera may be processed into the plurality of SAIs, and these SAIs may be arranged as the pseudo-sequences according to different sort manners such as the rotation order, the raster scanning order, and the zigzag-shaped and U-shaped scanning order, etc. Then, the current encoding standard is used to perform compression and encoding on the pseudo-sequences, and the bitstream is transmitted to the decoding end. Reconstructed light field pseudo-sequences are obtained after corresponding decoding is performed on the decoding end. Then, the light field pseudo-sequences are rearranged back to a light field SAI array according to an arrangement manner of the encoding end.

However, during a process of reconstructing and arranging the light field pictures to the pseudo-sequence for compression, accurate geometric information of the light field pictures are required to be acquired, so as to extract a multi-view image, resulting in great increase in computational complexity and poor prediction accuracy of complex textured areas in the content of the light field pictures.

It can be seen that, for the current compression solution for the light field picture, during the processing of the light field picture, high-efficiency and high-accuracy encoding and decoding processing cannot be performed on a current encoding and decoding standard technology. With the popularization of the light field camera, how to compress the light field picture acquired by the lenslet array and achieve high compression ratio and good compression performance is a problem to be solved at present.

Although a spatial correlation-based compression algorithm may improve the encoding efficiency by exploring the self-correlation of the light field picture, many compression algorithms have poor prediction accuracy of the complex textured area in the content of the light field picture. In addition, due to the special lenslet structure of the light field camera, the arrangement is very compact, so that there is only tiny horizontal parallax or vertical parallax between two adjacent SAIs. In addition, since the light field picture includes four-dimensional information of a three-dimensional scenario, there is a strong spatial correlation between the view images extracted from the light field picture. However, many algorithms do not fully explore the strong correlation between the view images and do not achieve the object of removing the redundancy of the light field picture as much as possible, so as to improve the encoding efficiency of the light field picture.

In order to solve the above technical problem, in the embodiments of this application, since the super-resolution reconstruction net may be used on a decoding end to perform spatial and angular super-resolution reconstruction on a low-resolution SAI, down-sampling processing may be used on an encoding end to reduce the spatial resolution and the angular resolution of the SAI, so that encoding and decoding processing may be performed on only partial light field picture. Therefore, the transmitted bitstream data can be effectively reduced, and encoding and decoding efficiency can be greatly enhanced, thereby enhancing the compression efficiency of the light field picture. Therefore, in this application, the design of the super-resolution reconstruction net is used, so that the spatial resolution and the angular resolution of the light field picture can be simultaneously improved. In this way, when the super-resolution reconstruction net is applied to the processing process of light field compression, the efficiency of compression processing can be obviously improved. Meanwhile, in this application, the QENet may also be used to improve the image quality of a result outputted by the super-resolution reconstruction net, so that the picture quality can be improved. To sum up, in this application, before the light field picture encoder compresses and encodes the light field picture, spatial and angular down-sampling processing may be performed on the light field picture, so as to obtain the low-resolution light field picture, so that a data size to be encoded can be reduced. Accordingly, after decoding, the light field picture decoder may use the super-resolution reconstruction net to perform spatial and angular up-sampling processing on the low-resolution light field picture, so as to construct the high-resolution light field picture. Therefore, transmitted bitstreams can be reduced, thereby greatly enhancing the encoding and decoding efficiency.

An embodiment of this application provides a light field SAI-based, end-to-end low-code rate light field picture compression solution. The solution may mainly include the pre-processing of the light field picture, the encoding of light field picture data, bitstream transmission, the decoding of the light field picture data and the post-processing of the light field picture. During a specific implementation, the solution may mainly include the construction of a low-resolution SAI pseudo-sequence, the encoding and decoding of the low-resolution SAI pseudo-sequence, and the super-resolution reconstruction of a decoded low-resolution SAI.

Further, in this application, an EPI thought-based network structure used for the spatial and angular super-resolution reconstruction of the light field picture is designed. The super-resolution reconstruction net entirely uses a branch-fusion structure, which may effectively perform spatial and angular super-resolution reconstruction on the low-resolution SAI. Meanwhile, a QENet Enhance-net is also designed, which is configured to enhance the picture quality of the reconstructed SAI outputted by the super-resolution reconstruction net. Experimental data shows that, the method for light field picture processing provided in this application has an obvious improvement effect on the super-resolution of the light field picture on the decoding end by means of the super-resolution reconstruction net, so that the transmission data size can be reduced by means of performing down-sampling processing of the spatial resolution and the angular resolution on the encoding end.

The technical solutions in the embodiments of this application are clearly and completely described below with reference to the drawings in the embodiments of this application.

Figure 4:
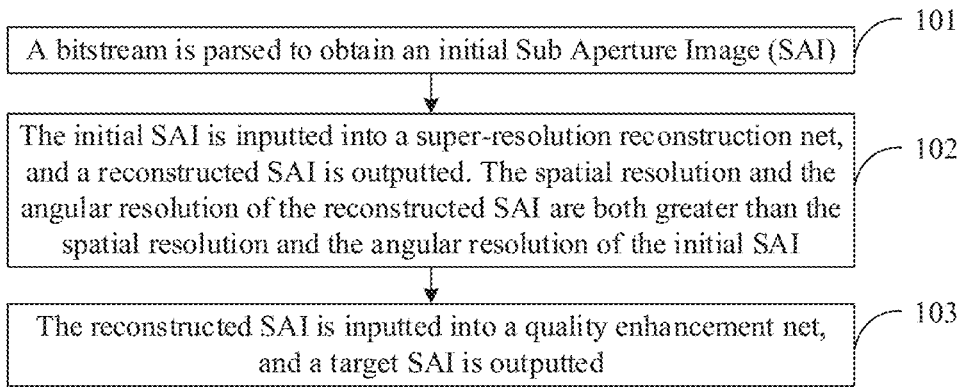
FIG. 4 is a schematic diagram I of an implementation process of a method for light field picture processing.

In an embodiment, an embodiment of this application provides a method for light field picture processing. The method for light field picture processing is applied to a light field picture decoder. FIG. 4 is a schematic diagram I of an implementation process of a method for light field picture processing. As shown in FIG. 4, in this embodiment of this application, the method that the light field picture decoder processes the light field picture may include the following operations.

At S101, a bitstream is parsed to obtain an initial SAI.

In the embodiments of this application, the light field picture decoder may first parse the bitstream, so as to obtain the initial SAI. The initial SAI is a low-resolution light field SAI.

Specifically, on the encoding side, a frame of lenslet image collected by a light field camera may be processed into a plurality of SAIs. After down-sampling processing is performed on the plurality of SAIs, the corresponding initial SAI is obtained. Since the initial SAI is obtained after down-sampling, the initial SAI is a SAI with low-resolution.

It is understandable that, in this embodiment of this application, the light field picture decoder may obtain an picture pseudo-sequence and a preset arrangement order by parsing the bitstream.

Specifically, on the encoding side, after the initial SAI is obtained by means of down-sampling, the initial SAI may be rearranged according to the preset arrangement order, so that the corresponding picture pseudo-sequence can be obtained.

Further, in the embodiments of this application, when the light field picture decoder obtains the initial SAI, by using the picture pseudo-sequence and the preset arrangement order that are determined by parsing the bitstream, the initial SAI can be obtained by inverse transformation. That is to say, in the embodiments of this application, the light field picture decoder may parse the bitstream, obtain the picture pseudo-sequence and the preset arrangement order, and then, generate the initial SAI based on the preset arrangement order and the picture pseudo-sequence.

Figure 5:
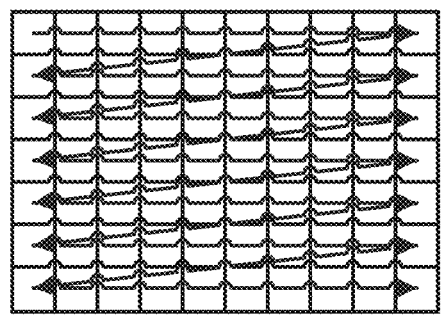
FIG. 5 is a schematic diagram I of a preset arrangement order.
Figure 6:
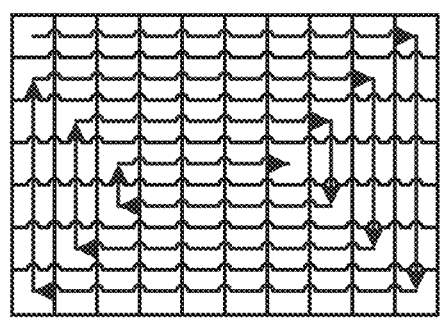
FIG. 6 is a schematic diagram II of a preset arrangement order.
Figure 7:
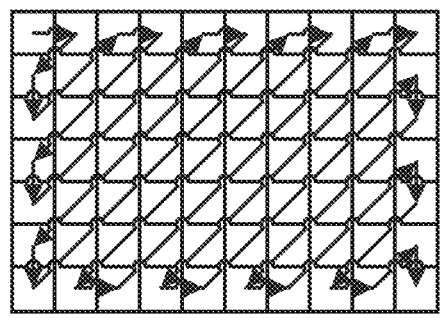
FIG. 7 is a schematic diagram III of a preset arrangement order.
Figure 8:
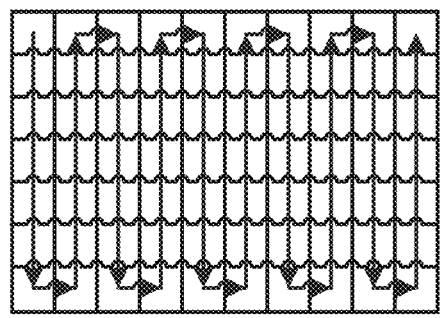
FIG. 8 is a schematic diagram IV of a preset arrangement order.

It is to be noted that, in the embodiments of this application, the preset arrangement order may include any one of a plurality of arrangement orders. FIG. 5 is a schematic diagram I of a preset arrangement order. FIG. 6 is a schematic diagram II of a preset arrangement order. FIG. 7 is a schematic diagram III of a preset arrangement order. FIG. 8 is a schematic diagram IV of a preset arrangement order. As shown in FIG. 5, FIG. 6, FIG. 7 and FIG. 8, the arrangement order may be any one of a rotation order, a raster scanning order, a zigzag-shaped scanning order and a U-shaped scanning order. Exemplarily, the raster scanning order may be selected to arrange the plurality of SAIs, so as to obtain the corresponding picture pseudo-sequence.

At S102, the initial SAI is inputted into a super-resolution reconstruction net, and a reconstructed SAI is outputted. The spatial resolution and the angular resolution of the reconstructed SAI are both greater than the spatial resolution and the angular resolution of the initial SAI.

In the embodiments of this application, after parsing the bitstream to obtain the initial SAI, the light field picture decoder may input the initial SAI into the super-resolution reconstruction network, so that a reconstructed SAI can be outputted. Specifically, the reconstructed SAI is a high-resolution SAI. That is, the spatial resolution and the angular resolution of the reconstructed SAI are both greater than the spatial resolution and the angular resolution of the initial SAI.

It is to be noted that, in the embodiments of this application, the super-resolution reconstruction net may be a Branch Fusion Super Resolution Net (BFSRNet) model, which mainly improves the picture resolution by using up-sampling processing, so that the resolution of an output picture may be higher than the resolution of an input picture.

That is to say, the core of the embodiments of this application is to design a BFSRNet model (i.e., the super-resolution reconstruction net), so as to improve the spatial resolution and the angular resolution of the picture, that is, super-resolution in space and time.

Further, in the embodiments of this application, when inputting the initial SAI into the super-resolution reconstruction net and outputting the reconstructed SAI, the light field picture decoder may specifically perform extraction processing first based on the initial SAI, so as to obtain an Epipolar Plane Image (EPI) set, then may perform up-sampling processing and feature extraction on the initial EPI set, so as to obtain a target EPI set, the resolution of a picture in the target EPI set being greater than the resolution of a picture in the initial EPI set, and may finally perform fusion processing on the target EPI set, so as to obtain the reconstructed SAI.

It is understandable that, in the embodiments of this application, the super-resolution reconstruction net may be an EPI-based light field picture super-resolution net structure, which can achieve the effect of the super-resolution of the entire light field picture by means of performing super-resolution on the EPI of different dimensions.

Specifically, in the embodiments of this application, the initial EPI set may be an EPI set corresponding to at least one any direction.

Further, in the embodiments of this application, when extraction processing is performed based on the initial SAI, so as to obtain the initial EPI set, the light field picture decoder may first perform sort processing on the initial SAI, so as to obtain a stereo picture set, and then perform extraction processing on the stereo picture set according to at least one direction, so as to obtain at least one initial EPI set. Herein, one direction corresponds to one initial EPI set.

Figure 9:
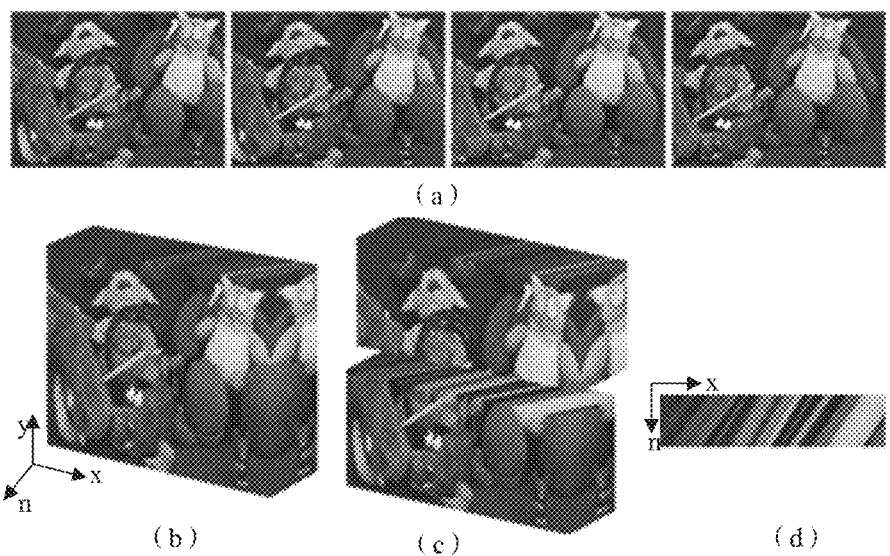
FIG. 9 is a schematic diagram of extracting an initial EPI set.

Exemplarily, in this application, FIG. 9 is a schematic diagram of extracting an initial EPI set. As shown in FIG. 9, (a) is a schematic diagram of the initial SAI after arrangement, that is, the low-resolution initial SAI obtained on the basis of the preset arrangement order. Next, the light field picture decoder may arrange and overlap the initial SAIs according to any one scanning method such as the rotation order, the raster scanning order, the zigzag-shaped order and U-shaped scanning order, so as to form a stereo collection set, that is, a stereo picture set, as shown in (b). As shown in (c), if an mth row (0≤m≤y) is selected along a y-axis direction as a tangent point, a sectioning operation is performed on the stereo picture set. That is to say, pixels at the same height of all pictures in the stereo picture set are extracted, so that a series of pictures with linear characteristics are obtained. These pictures are the EPI, as shown in (d). Each row corresponds to one EPI, so that all EPIs after the sectioning operation is performed form the initial EPI set. Likewise, if the same sectioning operation is performed along the x axis and the n axis, respective initial EPI sets on the corresponding axes can be obtained. One axis is a direction, and one direction (one axis) corresponds to one initial EPI set.

Further, in the embodiments of this application, when performing up-sampling processing and feature extraction on the initial EPI set to obtain the target EPI set, the light field picture decoder may first parse the bitstream to obtain a sampling parameter, perform up-sampling processing on the EPI set according to the sampling parameter to obtain a sampled EPI set, then use one or more convolution layers to perform feature extraction on the sampled EPI set, so as to obtain feature picture corresponding to the initial EPI set, and finally, construct the target EPI set based on the sampled EPI set and the feature picture.

It is to be noted that, in the embodiments of this application, the sampling parameter may include a sampling multiple corresponding to the up-sampling for the spatial resolution and a sampling multiple corresponding to the up-sampling for the angular resolution.

Specifically, in the embodiments of this application, when the initial EPI set corresponding to one direction is processed, up-sampling processing may be first performed to improve the resolution of each EPI in the initial EPI set; and then shallow feature extraction and deep feature extraction may be performed on the sampled EPI set by convolution calculation, so as to obtain the feature image corresponding to the initial EPI set. Finally, the sampled EPI set obtained after up-sampling processing may be connected to the feature image by jumping, so as to obtain a super-resolution EPI set, that is, a high-resolution target EPI set is constructed. The resolution of a picture in the target EPI set is greater than the resolution of a picture in the initial EPI set.

It is understandable that, in the embodiments of this application, on the basis of the super-resolution reconstruction net, the light field picture decoder may successively achieve the super-resolution of the initial EPI set corresponding to each direction according to the above method, so as to finally construct the target EPI set corresponding to each direction.

Further, in the embodiments of this application, when performing fusion processing on the target EPI set, so as to obtain the reconstructed SAI, the light field picture decoder may perform weighted average fusion on at least one target EPI set corresponding to at least one EPI set, so as to obtain the reconstructed SAI.

That is to say, in the present application, after completing the construction of all target EPI sets, the light field picture decoder may perform fusion processing by using the target EPI set corresponding to each direction, so as to finally complete the reconstruction of the SAIs.

Specifically, in the present application, the weighted average linear method may be used to fuse the target EPI set corresponding to each direction, so as to obtain the reconstructed SAI. It can be seen that, the light field picture decoder may use a simple weighted average manner for fusion processing, and may obtain a final output result of the super-resolution reconstruction net after fusion processing, that is, the reconstructed SAI.

At S103, the reconstructed SAI is inputted into a QENet, and a target SAI is outputted.

In the embodiments of this application, after inputting the initial SAI into the super-resolution reconstruction net and outputting the reconstructed SAI, the light field picture decoder may continuously input the reconstructed SAI into the QENet, so that the target SAI can be outputted. The picture quality of the target SAI is higher than the picture quality of the reconstructed SAI.

Further, in the embodiments of this application, after the super-resolution reconstruction net is used to improve the resolution, the QENet may also be used to further enhance the quality of the picture. The QENet may enhance the quality of each reconstructed SAI frame, or may also enhance the quality of part of reconstructed SAI frames. That is, the QENet is not fixed.

That is, in this application, the QENet is mainly configured to perform quality enhancement on at least one frame in the reconstructed SAI.

The embodiment provides a method for light field picture processing. The light field picture decoder parses the bitstream, so as to obtain the initial SAI; the initial SAI is inputted into the super-resolution reconstruction net, and the reconstructed SAI is outputted, where the spatial resolution and the angular resolution of the reconstructed SAI are both greater than the spatial resolution and the angular resolution of the initial SAI; and the reconstructed SAI is inputted into the QENet, and the target SAI is outputted. That is, in the embodiments of this application, since the super-resolution reconstruction net may be used on a decoding end to perform spatial and angular super-resolution reconstruction on a low-resolution SAI, down-sampling processing may be used on an encoding end to reduce the spatial resolution and the angular resolution of the SAI, so that encoding and decoding processing may be performed on only partial light field picture. Therefore, the transmitted bitstream data can be effectively reduced, and encoding and decoding efficiency can be greatly enhanced, thereby enhancing the compression efficiency of the light field picture. Therefore, in this application, the design of the super-resolution reconstruction net is used, so that the spatial resolution and the angular resolution of the light field picture can be simultaneously improved. In this way, when the super-resolution reconstruction net is applied to the processing process of light field compression, the efficiency of compression processing can be obviously improved. In addition, in this application, the QENet may also be used to improve the picture quality of a result outputted by the super-resolution reconstruction net, so that the picture quality can be improved.

Figure 10:
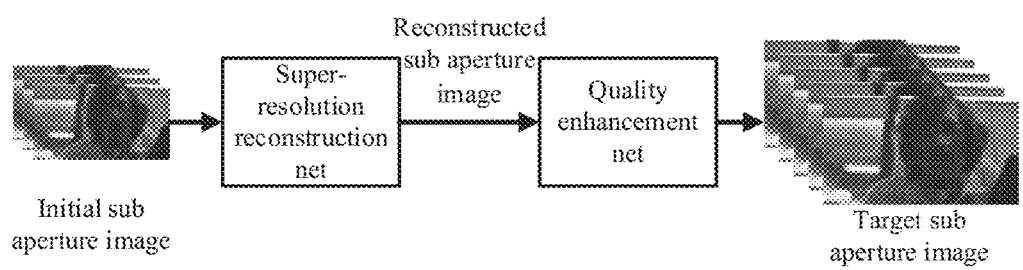
FIG. 10 is a schematic diagram of a processing process of a decoding end.

On the basis of the above embodiments, in another embodiment of this application, FIG. 10 is a schematic diagram of a processing process of a decoding end. As shown in FIG. 10, on a decoding end, after the initial SAI obtained by parsing the bitstream is inputted into the super-resolution reconstruction net, the reconstructed SAI may be outputted; and then, after the reconstructed SAI is inputted into the QENet, the target SAI can be outputted. The resolution of the reconstructed SAI is higher than the resolution of the initial SAI. The quality of the target SAI is higher than the quality of the reconstructed SAI.

It is understandable that, in the embodiments of this application, by using the above EPI thought, the light field picture decoder designs a low-resolution light field picture super-resolution reconstruction net EPI-SREH-Net. The designed net can simultaneously achieve the light field picture super-resolution in space and angle. On the basis of the super-resolution reconstruction net SR-net and the QENet Enhance-net that are included in an entire neural network structure, a specific process of achieving super-resolution by the light field picture decoder includes the following operations.

1. The acquired and decoded low-resolution sub-aperture light field pictures, that is, the initial SAIs, are respectively sent into a super-resolution net SR-net with three branches, and the output of each branch is the high-resolution SAI.
2. The outputs of the three-branch SR-net are fused by the weighted average linear method.
3. The fused high-resolution SAI is sent into the QENet Enhance-net, so as to obtain a light field SAI with higher quality, i.e., the target SAI.

Specifically, in this application, the super-resolution reconstruction net (for example, the BFSRNet model) mainly achieves simultaneous super-resolution on the initial SAIs in different dimensions, and obtains the super-resolution output result through fusion by means of weighted average. The QENet (for example, a QENet model) is mainly to improve the picture quality of the output result of the super-resolution reconstruction net.

Further, in the embodiments of this application, as the core for achieving a super-resolution function, the super-resolution reconstruction net may specifically include at least one branch module and a fusion module.

Figure 11:
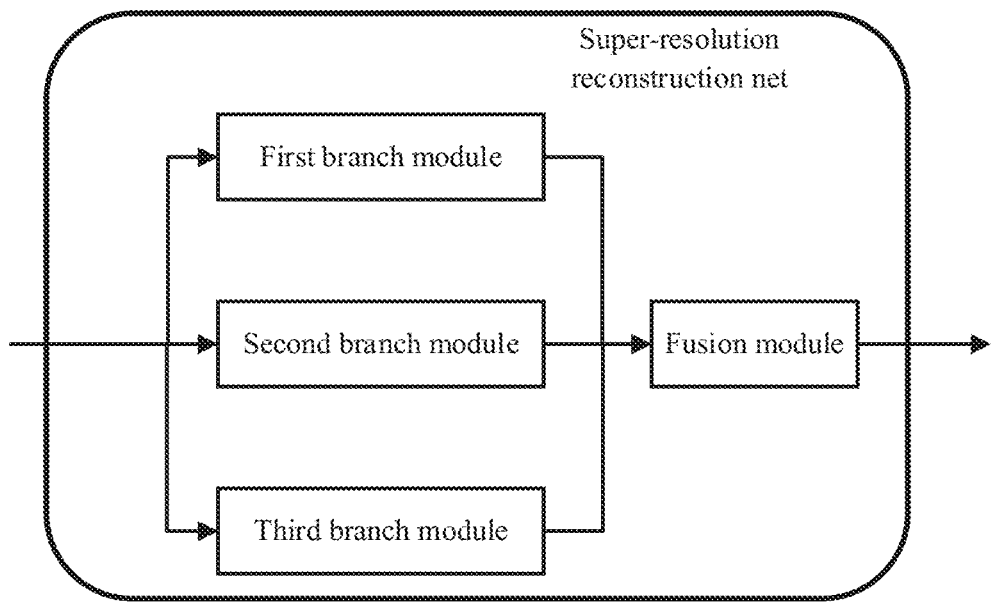
FIG. 11 is a schematic structural diagram of a super-resolution reconstruction net.

It is understandable that, in the embodiments of this application, FIG. 11 is a schematic structural diagram of a super-resolution reconstruction net. As shown in FIG. 11, an overall framework of the super-resolution reconstruction net includes a first branch (denoted with B1_SRNet) module, a second branch (denoted with B2_SRNet) module, a third branch (denoted with B3_SRNet) module and a fusion (denoted with Fusion) module. The threes branch modules, i.e., the first B1_SRNet module, the second B2_SRNet module and the third B3_SRNet module, take three directions in the stereo picture set into consideration. Each branch module may be regarded as an operation that is performed on the initial EPI sets of different directions in the stereo picture set.

It is to be noted that, in this application, the three branch modules use similar network structures, and only parameters of a ConvTranspose3d layer in a three-dimensional convolution module are different. Herein, the ConvTranspose3d layer may be called a transposed 3D convolution layer, or may be called a 3D deconvolution layer, 3D anti-convolution layer or the like.

Further, in the embodiments of this application, after the three branch modules complete respective super-resolution, the output result may be inputted into the fusion module again. Specifically, in this application, weighted average processing may be performed on the outputs of the three branch modules by means of the fusion module, and the reconstructed SAI may be finally obtained.

That is to say, in the embodiments of this application, fusion may be performed by simple weighted average, and then a final output result of the BFSRNet is obtained after fusion.

Figure 12:
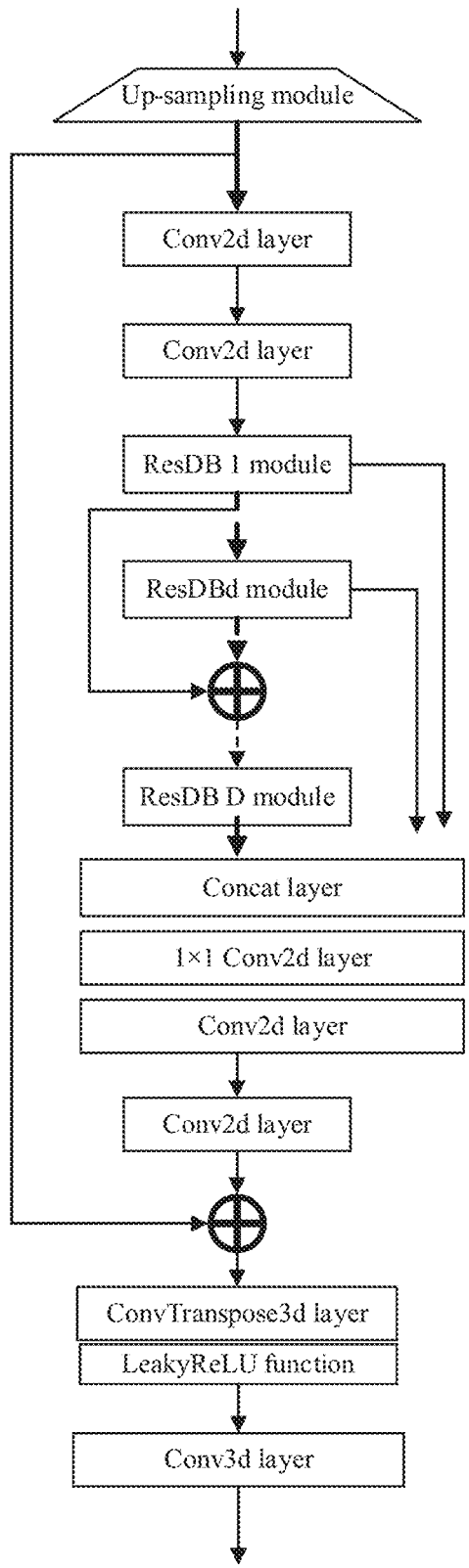
FIG. 12 is a schematic structural diagram of a branch module.

It is to be noted that, in the embodiments of this application, FIG. 12 is a schematic structural diagram of a branch module. As shown in FIG. 12, the super-resolution net first improves the resolution of the initial EPI set of the current dimension by means of the upsampling module (that is, using a simple upsampling operator), and then uses the convolution calculation module, including: shallow feature extraction of two Conv2d layers and deep feature extraction of a series of ResDB models (that is, an ResDB 1 model, . . . , an ResDB d model, . . . , and an ResDB D model, etc.). Herein, a residual learning manner is used by each ResDB model, and feature concatenation is performed on the outputs of a plurality of ResDB models by means of a connection (Concat) layer. Then, a 1×1 Conv2d layer is used to reduce the number of feature channels. In addition, residual reconstruction also uses the Conv2d layer, and then pictures obtained by the upsampling module are connected by means of jumping, so as to obtain the SR EPI set. Finally, it is also required to use the 3D deconvolution layer of the ConvTranspose3d layer to improve the three-dimensional resolution of the stereo picture set, and then the Conv3d layer is used to complete the SR reconstruction of the stereo picture set on the image resolution and frame rate. The ConvTranspose3d layer further includes a Leaky Rectified Linear Unit (Leaky ReLU) function.

Figure 13:
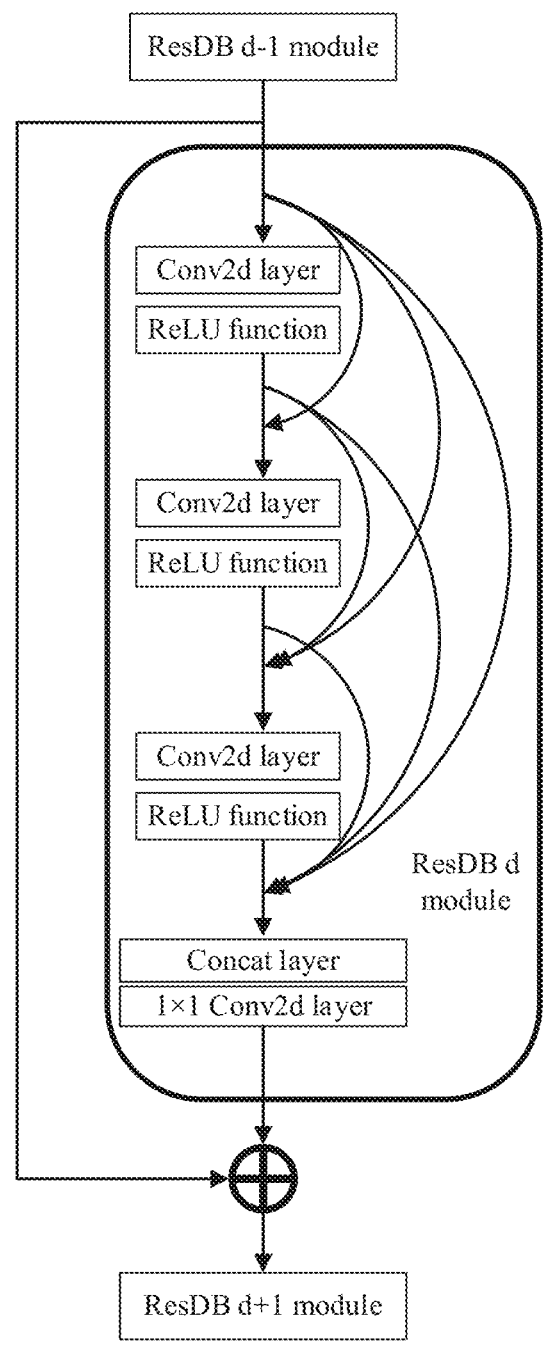
FIG. 13 is a schematic structural diagram of a ResDB module.

Further, in the embodiments of this application, FIG. 13 is a schematic structural diagram of a ResDB module, as shown in FIG. 13, which may be composed of three Conv2d layers with activation functions and one 1*1 Conv2d layer. Herein, each ResDB module is internally connected intensively. The outputs of the three Conv2d layers are concatenated by means of Concat, and then dimension reduction is performed by the 1*1 Conv2d layer. The ResDB models are connected to each other by means of jumping, i.e., the output of the previous module (i.e., the ResDB d−1 module) is superimposed with the output of the current module (i.e., the ResDB d module), and then a sum value is used as the input of the next module (i.e., the ResDB d+1 module).

It is to be noted that, the activation function may be a Rectified Linear Unit (ReLU) function and may also be called the ReLU, which is an activation function that is commonly used in the artificial neural network, and usually refers to a nonlinear function represented by a slope function and variants thereof. In addition, the Leaky ReLU function is a typical (and widely used) variant of the ReLu function. When the input value of the ReLu function is negative, the output is always 0, and a first-order derivative of the function is also always 0. In order to solve this disadvantage of the ReLu function, a leaky value is introduced in a negative half-interval of the ReLu function, which is called the Leaky ReLU function.

Therefore, in this application, for the picture pseudo-sequence $X_{s', t'}(x', y', n)$, $n=s' \times t'$ obtained by parsing the bitstream, and the corresponding initial SAI $LF^L(x', y', s', t')$, the sampling parameter obtained by parsing the bitstream includes a sampling multiple α of the spatial resolution and a sampling multiple β of the angular resolution.

When the super-resolution reconstruction net provided on the basis of the EPI thought is used to improve the spatial resolution and the angular resolution of the initial SAI, first, the initial SAI needs to be given to generate the initial EPI set corresponding to each direction. Then, by means of an up-sampling layer, the spatial resolution and the angular resolution of the single EPI in the initial EPI set are improved according to the sampling parameter. Next, by means of the shallow feature extraction of two convolution layers, the deep feature extraction of a series of densely connected ResDB convolution blocks and the residual map reconstruction of a 2d convolution layer, the EPI with improved resolution is obtained by adding the up-sampled image. Further, the resolution features of three dimensions may be improved by using 3D deconvolution. Finally, the reconstruction of the super-resolution light field picture is completed by using 3D convolution.

Exemplarily, by using one of the branches in the X-axis direction as an example, a specific data process of improving the resolution by means of the resolution network includes: first performing parsing to obtain a low-resolution picture pseudo-sequence $X_{s', t}(x', y', n)$, and performing sectioning in an x-axis dimension, so as to obtain the initial EPI set $I_0^i(y', n)$, $i \in R''$, $i \leq x'$ composed of x EPIs. Then, by means of the SR-net, α times super-resolution is performed on each EPI in the initial EPI set, so as to obtain the output $I_2^i(\alpha y', \alpha n)$, $i \in R''$, $i \leq x'$ of this part of the network, finally. Finally, x outputs are stacked again to obtain $T_{s', t}(x', \alpha y', \alpha n)$. After each branch of each axial direction is processed in order, weighted average fusion processing is performed on the results outputted by various branches, so that the final output $Y_{s, t}(x, y, n)$ of the super-resolution network can be obtained, where $x=\alpha x'$, $y=\alpha y'$, $s=\beta s'$, $t=\beta t'$.

Further, after the super-resolution reconstruction net is used to improve the resolution of the initial SAI to obtain the reconstructed SAI, the picture quality of the reconstructed SAI is required to be further improved. In this case, the QENet is added. The QENet may enhance the picture quality frame by frame, and may also enhance the picture quality of part frames. That is to say, the QENet is not fixed. Generally, the QENet comprises a QENet model. The QENet model may use any current picture QENet model, for example, a Super-Resolution Convolutional Neural Network (SRCNN) model, an Artifacts Reduction Convolutional Neural Network (ARCNN) model, a Very Deep convolutional networks for Super-Resolution (VDSR) model, a Recurrent Back-Projection Network for Video Super-Resolution (RBPN) model and a Video Restoration with Enhanced Deformable Convolutional Networks (EDVR) model. Due to the requirement for the complexity of light field picture encoder design, it is suggested that a network with desirable effect and low complexity is selected. In the embodiments of this application, it may be more appropriate to select the ARCNN model.

Figure 14:
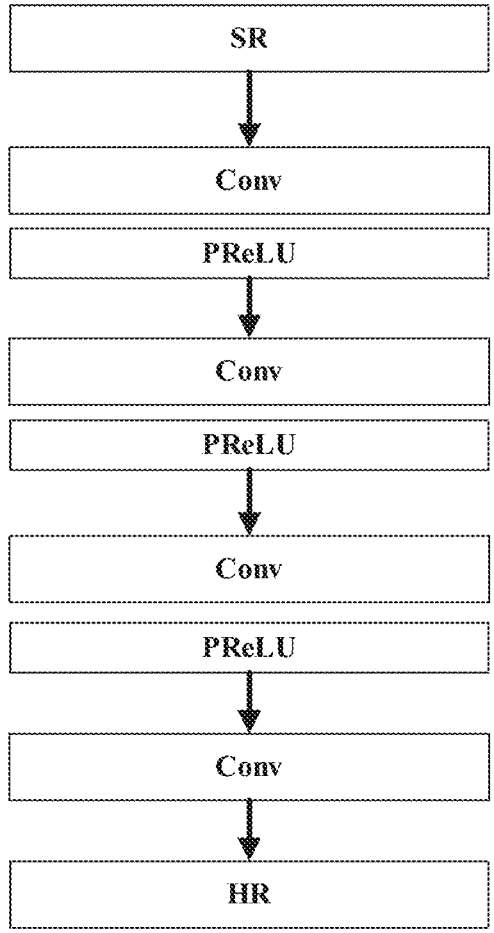
FIG. 14 is a schematic structural diagram of a QENet.

FIG. 14 is a schematic structural diagram of a QENet. As shown in FIG. 14, the QENet may be composed of four convolution layers. In addition to the last convolution layer for reconstruction, the remaining three convolution layers are used for the activation of a PReLU function.

Further, in the embodiments of this application, during the enhancement processing of the picture quality, the reconstructed SAIs outputted by the super-resolution reconstruction net may be used as inputs one by one to send to the QENet. By means of three convolution layers with activation functions and a 2D convolution layer for picture reconstruction, the SAIs with enhanced quality can be finally obtained by translation, that is, the target SAIs. Therefore, in this application, the input of the QENet is each high-resolution reconstructed SAI, and the output of the QENet is the high-resolution target SAI with enhanced quality.

The embodiment provides the method for light field picture processing. The light field picture decoder parses the bitstream, so as to obtain the initial SAI; the initial SAI is inputted into the super-resolution reconstruction net, and the reconstructed SAI is outputted, where the spatial resolution and the angular resolution of the reconstructed SAI are both greater than the spatial resolution and the angular resolution of the initial SAI; and the reconstructed SAI is inputted into the QENet, and the target SAI is outputted. That is, in the embodiments of this application, since the super-resolution reconstruction net may be used on a decoding end to perform spatial and angular super-resolution reconstruction on a low-resolution SAI, down-sampling processing may be used on an encoding end to reduce the spatial resolution and the angular resolution of the SAI, so that encoding and decoding processing may be performed on only partial light field picture. Therefore, the transmitted bitstream data can be effectively reduced, and encoding and decoding efficiency can be greatly enhanced, thereby enhancing the compression efficiency of the light field picture. Therefore, in this application, the design of the super-resolution reconstruction net is used, so that the spatial resolution and the angular resolution of the light field picture can be simultaneously improved. In this way, when the super-resolution reconstruction net is applied to the processing process of light field compression, the efficiency of compression processing can be obviously improved. In addition, in this application, the QENet may also be used to improve the picture quality of a result outputted by the super-resolution reconstruction net, so that the picture quality can be improved.

Figure 15:
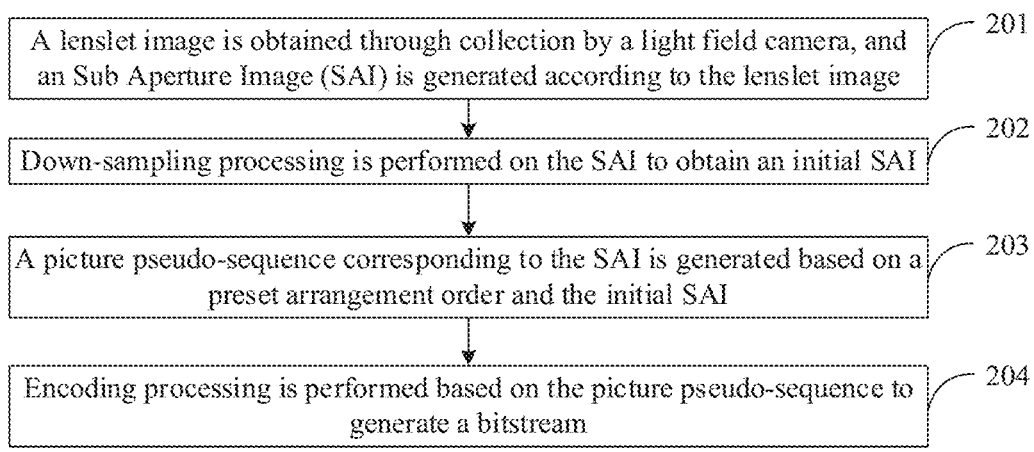
FIG. 15 is a schematic diagram II of an implementation process of a method for light field picture processing.

In another embodiment, an embodiment of this application provides a method for light field picture processing. The method for light field picture processing is applied to a light field picture encoder. FIG. 15 is a schematic diagram II of an implementation process of a method for light field picture processing. As shown in FIG. 15, in the embodiments of this application, the method that the light field picture encoder processes the light field picture may include the following operations.

At S201, a lenslet image is obtained through collection by a light field camera, and an SAI is generated according to the lenslet image.

In the embodiments of this application, the light field picture encoder may first obtain the lenslet image through collection by the light field camera, and then may generate the SAI according to the lenslet image.

Further, in the embodiments of this application, the light field camera may perform collection by a configured microscope array, so as to obtain the light field picture, that is, the lenslet image.

It is to be noted that, in the embodiments of this application, in order to be more applicable to the current encoding and decoding standard, the light field picture encoder does not directly compress the lenslet image by using the current encoding and decoding standard technology after obtaining the lenslet image through collection by the light field camera, but may first transform the lenslet image to obtain the corresponding SAI.

It is understandable that, in the embodiments of this application, when the lenslet image is converted into the SAI, a portion with higher luminance in a center area of the lenslet image may be first extracted, and then all pixels at the same position are all extracted and rearranged, so that the SAIs can be obtained.

Figure 16:
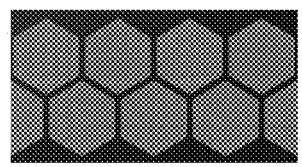
FIG. 16 is a partial enlarged view of a lenslet image.
Figure 17:
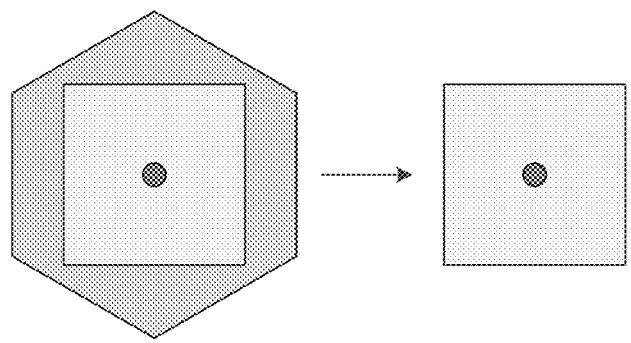
FIG. 17 is a schematic diagram of preliminary extraction.

FIG. 16 is a partial enlarged view of a lenslet image. FIG. 17 is a schematic diagram of preliminary extraction. As shown in FIG. 16 and FIG. 17, the luminance of the lenslet image is gradually darkened from the center to the surroundings, the reason is that an edge position of the lenslet image receives less light rays due to the strong convergence of the light rays, such that only the position with higher luminance in the center area of the lenslet image needs to be extracted.

Further, in this application, the extracted pictures of the center area may be sorted according to a lenslet arrangement order. Ai is a center pixel of various pictures, and Bi, Ci and Di are respectively pixels of three positions, where i is 1, 2, . . . . Next, the SAI of a required viewpoint can be obtained by extracting the pixels of all the same positions of the lenslet images and performing the rearrangement operation. That is to say, the process for extracting the SAIs mainly includes extracting the center points of the lenslet images, and sorting the center points of the lenslet images, so as to generate the SAIs.

Further, in the embodiments of this application, the SAIs obtained by converting the lenslet images obtained through collection by the light field camera are images formed at each angle of the light field, and may have the angular resolution and the spatial resolution. The spatial resolution of the SAI may be the number of pixels of the SAI, that is, may represent the number of the lenslet in the lenslet array of the light field camera. The angular resolution of the SAI may be the number of the SAIs.

Figure 18:
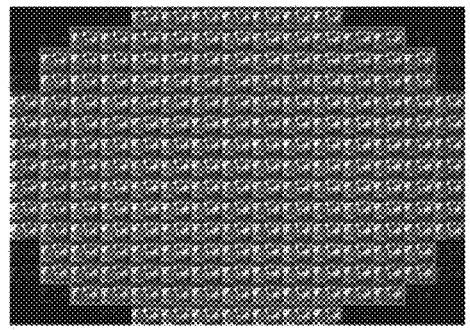
FIG. 18 is an SAI array.

It is to be noted that, in the embodiments of this application, the SAIs generated on the basis of the lenslet images may be a series of 2D image arrays LF (x, y, s, t), where there are a total of (s×t) SAIs, that is, the angular resolution is (s×t); and the size of each SAI is (x×y), that is, the spatial resolution is (x×y). FIG. 18 is an SAI array. As shown in FIG. 18, it is to be noted that, in the SAI array, compared with the center portion, the SAIs at the four corners are darker, and the closer to the edge portion, the more serious the image distortion and blurring. Therefore, a general compression process removes the SAIs at these edge corners.

Exemplarily, in this application, when the SAIs are extracted, assuming that there are 300 rows and 400 columns in the lenslet array, that is to say, there are 12000 lenslet, there are 30×30 pixels under each lenslet, that is, the radius is about 30 pixels. Then 30×30 SAIs may be extracted. Each SAI is 300×400 pixels, and for the SAI of the center angle, the pixel values at the center position of each lenslet can be sequentially extracted and reassembled into a new 300×400 image in order, which is the SAI.

That is to say, the pixel value of the center of the lenslet at (0, 0) is the pixel value of the SAI at (0, 0); and the pixel value of the center of the lenslet at (0, 1) is the pixel value of the SAI at (0, 1), and so on, until all of the lenslets are traversed.

Same as the principle of extracting the central SAIs, all of the lenslets are only traversed in order as before. According to the coordinates of the center of the lenslet, the coordinates of a certain angle are inferred. The pixel values are extracted and reassembled into a new image, which is the SAI of the angle.

At S202, down-sampling processing is performed on the SAI, so as to obtain an initial SAI.

In the embodiments of this application, after obtaining the lenslet image through collection by means of the light field camera, and generating, according to the lenslet image, the SAI, the light field picture encoder may first perform down-sampling processing on the SAI, so as to obtain a sampled SAI. The resolution of the sampled SAI is less than the resolution of the SAI before down-sampling.

It is to be noted that, in the embodiments of this application, when performing down-sampling processing on the SAI, the light field picture encoder may perform, according to a sampling parameter, down-sampling processing respectively on the spatial resolution and the angular resolution of the SAI, so as to finally complete the construction of the initial SAI.

It is understandable that, in the embodiments of this application, since the down-sampling for the spatial resolution and the down-sampling for the angular resolution are respectively performed, the sampling parameter may include a sampling multiple corresponding to the down-sampling for the spatial resolution and a sampling multiple corresponding to the down-sampling for the angular resolution.

That is to say, in this application, the light field picture encoder may respectively perform the down-sampling for the spatial resolution and the down-sampling for the angular resolution respectively according to the corresponding sampling multiples, so that the initial SAI can be obtained.

It is understandable that, in this application, the initial SAI after down-sampling processing is performed is the low-resolution SAI.

Exemplarily, in this application, for the SAI LF (x, y, s, t), a times down-sampling for the spatial resolution can be performed on the SAI, and β times down-sampling for the angular resolution can be performed on the SAI (α and β form the sampling parameter), so that the low-resolution SAI can be constructed, which is the initial SAILF$^L$(x', y', s', t'), where x=αx', y=αy', s=βs', t=βt'.

At S203, a picture pseudo-sequence corresponding to the SAI is generated based on a preset arrangement order and the initial SAI.

In the embodiments of this application, after performing down-sampling processing on the SAI, so as to obtain the initial SAI, the light field picture encoder may further generate, based on the preset arrangement order and the initial SAI, the picture pseudo-sequence corresponding to the SAI.

It is to be noted that, in the embodiments of this application, after obtaining the low-resolution initial SAI, the light field picture encoder may sort the initial SAIs according to a certain order, that is, generate the corresponding picture pseudo-sequences based on the preset arrangement order.

It is understandable that, in the embodiments of this application, the preset arrangement order may include any one of a plurality of arrangement orders. For example, the preset arrangement order may be any one of a rotation order, a raster scanning order, a zigzag-shaped scanning order and a U-shaped scanning order.

Further, in the embodiments of this application, after performing rearrangement processing on the initial SAIs according to the preset arrangement order, the light field picture encoder may determine the corresponding picture pseudo-sequences V$^L$(x', y', n), where V$^L$(x', y', n)=LF$^L$(x', y', s', t'), n=s'×t'.

At S204, encoding processing is performed based on the picture pseudo-sequence to generate a bitstream.

In the embodiments of this application, after generating the picture pseudo-sequence corresponding to the sub-aperture image on the basis of the preset arrangement order and the initial sub-aperture image, the light field picture encoder may perform processing based on the picture pseudo-sequence, so as to generate a corresponding binary bitstream.

Further, in the embodiments of this application, the light field picture encoder may use the current encoding standard for encoding, so that the picture pseudo-sequence corresponding to the low-resolution initial SAI may be signalled into the bitstream, so as to complete the compression of a square picture.

It is understandable that, in the embodiments of this application, an efficient encoding and decoding device may be selected from the encoding and decoding device of the current mainstream encoding standard, such as HEVC or VVC.

Further, in the embodiments of this application, after the picture pseudo-sequence corresponding to the sub-aperture image is generated on the basis of the preset arrangement order and the initial sub-aperture image, that is, after S203, the light field picture encoder may further signals the sort parameter corresponding to the preset arrangement order in the bitstream. The sort parameter is used for indicating the preset arrangement order of the generated picture pseudo-sequences.

Exemplarily, in this application, if the light field picture encoder uses the rotation order to sort the initial SAIs, the light field picture encoder may signal the sort parameter in the bitstream after setting the sort parameter to 0. If the light field picture encoder uses the raster scanning order to sort the initial SAIs, the light field picture encoder may signal the sort parameter in the bitstream after setting the sort parameter to 1. If the light field picture encoder uses the zigzag-shaped scanning order to sort the initial SAIs, the light field picture encoder may signal the sort parameter in the bitstream after setting the sort parameter to 2. If the light field picture encoder uses the U-shaped scanning order to sort the initial SAIs, the light field picture encoder may signal the sort parameter in the bitstream after setting the sort parameter to 4.

Further, in the embodiments of this application, after down-sampling processing is performed on the SAI, so as to obtain the initial SAI, that is, after the S202, the light field picture encoder may further signal the sampling parameter in the bitstream to transmit to the decoding side.

By means of the method for light field picture processing provided in S201 to S204, the angular resolution and the spatial resolution of the SAI can be reduced by means of down-sampling processing, so as to obtain the initial SAI of low-resolution. Since the super-resolution reconstruction of the SAI can be achieved on the decoding side, the light field picture encoder may directly signal the picture pseudo-sequence corresponding to the initial SAI in the bitstream to transmit to the light field picture decoder.

This embodiment provides the method for light field picture processing. The light field picture encoder obtains the lenslet image through collection by means of the light field camera, and an SAI is generated according to the lenslet image; down-sampling processing is performed on the SAI, so as to obtain the initial SAI; the picture pseudo-sequence corresponding to the SAI is generated on the basis of a preset arrangement order and the initial SAI; and encoding processing is performed on the basis of the picture pseudo-sequence, so as to generate the bitstream. That is to say, in the embodiments of this application, since the super-resolution reconstruction net may be used on a decoding end to perform spatial and angular super-resolution reconstruction on a low-resolution SAI, down-sampling processing may be used on an encoding end to reduce the spatial resolution and the angular resolution of the SAI, so that encoding and decoding processing may be performed on only partial light field picture. Therefore, the transmitted bitstream data can be effectively reduced, and encoding and decoding efficiency can be greatly enhanced, thereby enhancing the compression efficiency of the light field picture. Therefore, in this application, the design of the super-resolution reconstruction net is used, so that the spatial resolution and the angular resolution of the light field picture can be simultaneously improved. In this way, when the super-resolution reconstruction net is applied to the processing process of light field compression, the efficiency of compression processing can be obviously improved. Meanwhile, in this application, the QENet may also be used to improve the picture quality of a result outputted by the super-resolution reconstruction net, so that the picture quality can be improved.

Figure 19:
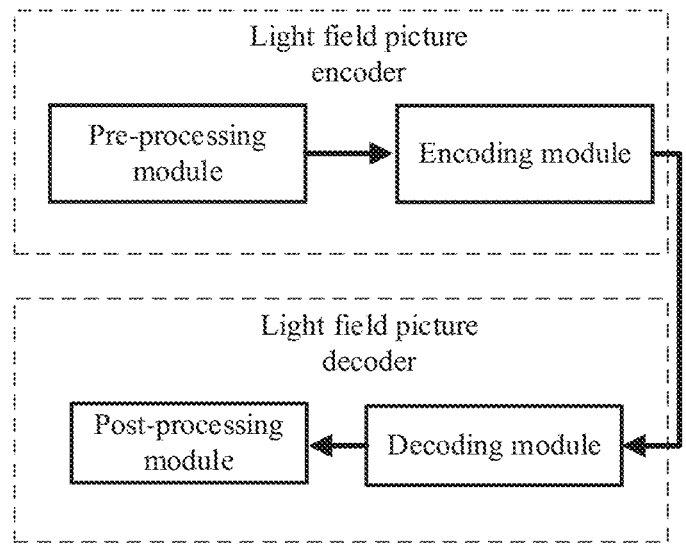
FIG. 19 is a schematic diagram of a light field picture encoder and a light field picture decoder that are used for achieving light field picture processing.

On the basis of the above embodiments, in still another embodiment of this application, FIG. 19 is a schematic diagram of a light field picture encoder and a light field picture decoder that are used for achieving light field picture processing. As shown in FIG. 19, the light field picture encoder may include a pre-processing module and an encoding module. The light field picture decoder may include a decoding module and a post-processing module.

Figure 20:
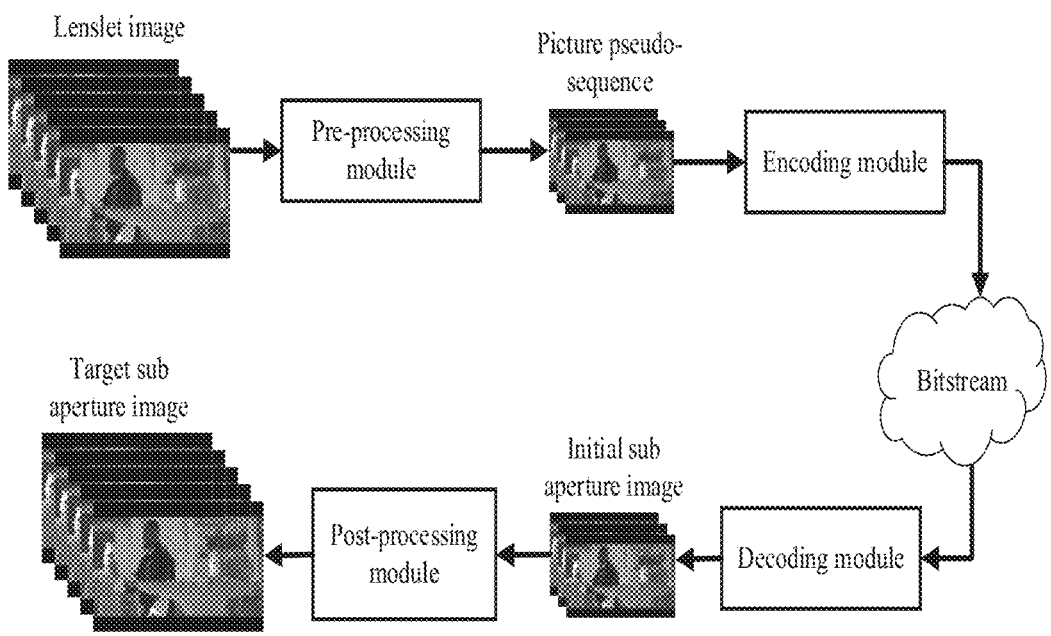
FIG. 20 is a schematic structural diagram of a method for light field picture processing.

FIG. 20 is a schematic structural diagram of a method for light field picture processing. As shown in FIG. 20, on an encoding end, for the input lenslet image collected by the light field camera, the pre-processing module may convert the lenslet image into the SAI, then perform down-sampling processing on the SAI according to the sampling parameter, so as to obtain the initial SAI of low-resolution, next may rearrange the initial SAIs according to the preset arrangement order and output the picture pseudo-sequence, and then perform encoding processing by means of the encoding module, so as to signal the picture pseudo-sequence, the sampling parameter and the preset arrangement order in the bitstream. The bitstream is a binary bitstream, for example, 1010001011101010. After the encoding module transmits the bitstream to the decoding end, the decoding module may parse the bitstream, to obtain the picture pseudo-sequence, the sampling parameter and the preset arrangement order. Then, the initial SAI of low resolution is obtained by using the picture pseudo-sequence and the preset arrangement order. Next, the post-processing module performs super-resolution reconstruction on the initial SAI through the super-resolution reconstruction net, so as to obtain the reconstructed SAI of high-resolution, and uses the QENet to further improve the picture quality, so as to obtain a high-quality target SAI. Specifically, the post-processing module may use the super-resolution network in the embodiments of this application to achieve super-resolution reconstruction. That is to say, the super-resolution network plays a role of performing super-resolution reconstruction to convert the low-resolution SAI to the high-resolution SAI.

It can be seen that, in this application, it is because the light field camera is different from a conventional imaging device, not only light intensity in a spatial scenario can be recorded, but also its directional information can be recorded. Due to the special structure of the lenslet, the arrangement is very compact, so that there is only tiny horizontal parallax or vertical parallax between two adjacent SAIs, and there is a strong correlation between the SAIs. Meanwhile, there is a certain degree of spatial redundancy in each SAI. Considering the strong correlation between the adjacent SAIs and the spatial correlation of each SAI itself, according to the method for light field picture processing provided in this application, compression encoding is not required to be performed on the whole light field picture on the encoding end, as long as the low-resolution picture of partial light field picture is compressed. On the decoding end, a portion that is not encoded can be reconstructed by means of the correlation between the SAIs, so that the bitstream can be saved, thereby enhancing the encoding efficiency.

Further, in the embodiments of this application, a pre-processing manner used by the pre-processing module on the encoding end may specifically use down-sampling to reduce the resolution of the light field picture. The pre-processing method is not fixed, for example, down-sampling, color space conversion, and the like. The post-processing module on the decoding end correspondingly uses the super-resolution reconstruction net to restore the light field picture. Therefore, by means of the pre-processing manner of down-sampling, a processing process of the light field picture mainly includes the construction of a low-resolution SAI pseudo-sequence, the encoding and decoding of the low-resolution SAI pseudo-sequence, and the super-resolution reconstruction of a decoded low-resolution SAI.

It is to be noted that, in the embodiments of this application, for the light field picture, several times of down-sampling is first performed, according to the sampling parameter, on the light field SAI required to be compressed in space and angle; and then the light field SAI is converted into a YUV420 format, so as to construct a low-resolution SAI pseudo-sequence. Then, the current encoding and decoding standard is used to perform the encoding and decoding of the pseudo-sequence. Finally, on the basis of the designed super-resolution reconstruction net, all of the SAIs of which resolutions are the same as that of an original SAI are reconstructed on the decoding end.

It is understandable that, the method for light field picture processing provided in this application may be applied to a low-code rate light field picture compression solution. The current light field pictures mostly have high resolutions. If the whole light field picture is directly compressed, low encoding efficiency and large bitstream amount are caused. The method for light field picture processing provided in this application is the low-code rate compression solution, so that the above problems can be effectively solved.

Further, in the embodiments of this application, when constructing the super-resolution reconstruction net, the light field picture decoder may first determine a first network parameter corresponding to the super-resolution reconstruction net, and construct the super-resolution reconstruction net on the basis of the first network parameter.

It is understandable that, in this application, the light field picture decoder may use various manners to determine the first network parameter corresponding to the super-resolution reconstruction net.

Exemplarily, in this application, the light field picture decoder may first acquire first training data, the first training data including a low-resolution picture and a corresponding high-resolution picture, and then perform model training by means of the first training data, so as to finally determine the first network parameter.

Exemplarily, in this application, the light field picture decoder may parse the bitstream to directly obtain the first network parameter. That is to say, on the encoding end, the light field picture encoder may signal the first network parameter in the bit stream to transmit to the decoding end.

It is to be noted that, the first training data may include a plurality of groups of pictures. Each group of pictures is composed of a frame of low-resolution picture and a corresponding frame of high-resolution picture. The first training data is used for training a model parameter, so as to obtain the first network parameter of the super-resolution reconstruction net.

That is to say, for the first network parameter of the super-resolution reconstruction net, in one aspect, the first network parameter may be obtained by performing model parameter training according to the first training data; and in the other aspect, model parameter training may be performed by the light field picture encoder, then the trained first network parameter is signalled in the bitstream, and the first network parameter is directly obtained by parsing the bitstream by means of the light field picture decoder. No limitations are constituted in the embodiments of this application.

Further, in the embodiments of this application, when constructing the QENet, the light field picture decoder may first determine a second network parameter corresponding to the QENet, and construct the QENet on the basis of the second network parameter.

It is understandable that, in this application, the light field picture decoder may use various manners to determine the second network parameter corresponding to the QENet.

Exemplarily, in this application, the light field picture decoder may first acquire second training data, the first training data including a low-quality picture and a corresponding high-quality picture, and then perform model training by means of the second training data, so as to finally determine the second network parameter.

Exemplarily, in this application, the light field picture decoder may parse the bitstream to directly obtain the second network parameter. That is to say, on the encoding end, the light field picture encoder may signal the second network parameter in the bitstream to transmit to the decoding end.

It is to be noted that, the second training data may include a plurality of groups of pictures. Each group of pictures is composed of a frame of low-quality picture and a corresponding frame of high-quality picture. The second training data is used for training a model parameter, so as to obtain the second network parameter of the QENet.

That is to say, for the second network parameter of the QENet, in one aspect, the second network parameter may be obtained by performing model parameter training according to the second training data; and in the other aspect, model parameter training may be performed by the light field picture encoder, then the trained second network parameter is signalled in the bitstream, and the second network parameter is directly obtained by parsing the bitstream by means of the light field picture decoder. No limitations are constituted in the embodiments of this application.

In brief, the embodiments of this application are mainly intended to solve the current problems of low encoding efficiency caused during light field picture compression. By means of down-sampling during pre-processing and then the restoration reconstruction during post-processing, the current problem of low encoding and decoding efficiency can also be effectively solved.

It is to be noted that, in the embodiments of this application, in the construction of the low-resolution SAI pseudo-sequence, low-resolution down-sampling uses a bicubic method. The method here is not fixed, as long as a down-sampling effect can be achieved. The super-resolution reconstruction of the decoded low-resolution SAI is also not limited to the network structure designed in the embodiments of this application; and other network structures with the same function can be replaced, only that there may be differences in the reconstruction performance.

In addition, in the embodiments of this application, the network structure of the super-resolution reconstruction net may be changed. Specifically, the three branches of the BFSRNet model may be appropriately deleted, so as to meet the requirements of different computing capabilities at different scenarios. The network structure of the QENet usually uses an ARCNN model in an actual application, but is not limited herein, as long as an effect of enhancing the picture quality can be met. All changes have the potential to make a difference to the final picture quality.

Further, in the embodiments of this application, the application of the super-resolution reconstruction net of the light field picture is not only limited to the post-processing of the decoded pseudo-sequence, but can also be applied to the inter- or intra-frame prediction portion of the light field picture encoder to improve the prediction accuracy.

It can be seen that, the method for light field picture processing provided in the embodiments of this application can greatly enhance the encoding efficiency. Specifically, before compression and encoding, down-sampling for the resolution is performed on the light field picture in space and angle, so that the data size of a picture to be encoded is greatly reduced. After decoding, the super-resolution reconstruction net is used to perform corresponding up-sampling, so as to restore a high-resolution light field picture. Generally, the code rate can be obviously reduced, and the encoding efficiency can be greatly enhanced, thereby reducing transmission bitstreams.

In addition, the design of the QENet used in the embodiments of this application greatly improves the picture quality. Therefore, in the processing process of applying the provided super-resolution reconstruction net and the QENet to the compression of the light field picture, the quality of the compressed light field picture can be obviously improved, and there is an obvious effect on improving the super-resolution of the light field picture.

That is to say, according to the method for light field picture processing provided in the embodiments of this application, the super-resolution reconstruction net and the QENet may be used to simultaneously achieve two effects of improving the super-resolution and the quality of the light field picture.

It is understandable that, in the embodiments of this application, since the decoding side may use the super-resolution reconstruction net to perform super-resolution reconstruction on the low-resolution SAI, on the encoding side, after converting the lenslet image into the SAI, the light field picture encoder obtains the low-resolution SAI by means of down-sampling processing and may use the current encoding and decoding standard technology for encoding, so that the light field picture encoder can well adapt a current encoding and decoding framework, without modifying the structure of the light field picture decoder.

This embodiment provides the method for light field picture processing. The light field picture decoder parses the bitstream, so as to obtain the initial SAI; the initial SAI is inputted into the super-resolution reconstruction net, and the reconstructed SAI is outputted, where the spatial resolution and the angular resolution of the reconstructed SAI are both greater than the spatial resolution and the angular resolution of the initial SAI; and the reconstructed SAI is inputted into the QENet, and the target SAI is outputted. The light field picture encoder obtains the lenslet image through collection by means of the light field camera, and an SAI is generated according to the lenslet image; down-sampling processing is performed on the SAI, so as to obtain the initial SAI; the picture pseudo-sequence corresponding to the SAI is generated on the basis of a preset arrangement order and the initial SAI; and encoding processing is performed on the basis of the picture pseudo-sequence, so as to generate the bitstream. That is to say, in the embodiments of this application, since the super-resolution reconstruction net may be used on a decoding end to perform spatial and angular super-resolution reconstruction on a low-resolution SAI, down-sampling processing may be used on an encoding end to reduce the spatial resolution and the angular resolution of the SAI, so that encoding and decoding processing may be performed on only partial light field picture. Therefore, the transmitted bitstream data can be effectively reduced, and encoding and decoding efficiency can be greatly enhanced, thereby enhancing the compression efficiency of the light field picture. Therefore, in this application, the design of the super-resolution reconstruction net is used, so that the spatial resolution and the angular resolution of the light field picture can be simultaneously improved. In this way, when the super-resolution reconstruction net is applied to the processing process of light field compression, the efficiency of compression processing can be obviously improved. Meanwhile, in this application, the QENet may also be used to improve the picture quality of a result outputted by the super-resolution reconstruction net, so that the picture quality can be improved.

On the basis of the above embodiments, in yet another embodiment of this application, the super-resolution reconstruction net and the QENet may be implemented on a PC by using a PyTorch platform with an Nvidia GTX 1080Ti GPU. A training set and a test set used for experiments are from a real light field dataset EPFL, Lytro Ilium, and a synthetic light field dataset HCI.

The experiment achieves 2 times super-resolution results in both space and angle. That is to say, the sampling multiple of the spatial resolution and the sampling multiple of the angular resolution in the sampling parameter are both set to 2, that is, the resolution of the input light field picture is $x \times y \times s \times t$, and the resolution of the output light field picture is $2x \times 2y \times 2s \times 2t$. A Peak Signal to Noise Ratio (PSNR) and Structural SIMilarity (SSIM) are used as evaluation indicators. The picture resolutions of different datasets are different. The directly-obtained light field SAI is used as the high-resolution picture. A Matlab platform uses the low-resolution SAI obtained by means of 2x down-sampling of the spatial angle as the input of a network. Details are as follows.

The EPFL dataset: the resolution of the input light field picture is $217 \times 312 \times 4 \times 4$, and the output resolution is $434 \times 624 \times 8 \times 8$.

The Lytro Ilium dataset: the input resolution is $187 \times 270 \times 4 \times 4$, and the output resolution is $374 \times 540 \times 8 \times 8$.

The HCI dataset: the input resolution is $256 \times 256 \times 4 \times 4$, and the output resolution is $512 \times 512 \times 8 \times 8$.

A specific experimental result is shown in Table 1. Compared with some current algorithms such as LFCNN and LFSR, the method for light field picture processing provided in this application has obvious improvement on PSNR and SSIM.

TABLE 1

| Training dataset | Test dataset | PSNR(dB) | SSIM |
| --- | --- | --- | --- |
| Lytro ILLum | EPFL | 33.52 | 0.9533 |
| | HCI | 32.62 | 0.8952 |
| | Lytro ILLum | 36.81 | 0.9588 |
| EPFL | EPFL | 35.10 | 0.9568 |
| | HCI | 32.91 | 0.9026 |
| | Lytro ILLum | 36.54 | 0.9575 |
| HCI | EPFL | 32.90 | 0.9516 |
| | HCI | 34.02 | 0.9259 |
| | Lytro ILLum | 36.01 | 0.9510 |
| Mix (Three datasets are mixed) | EPFL | 34.91 | 0.9565 |
| | HCI | 33.18 | 0.9084 |
| | Lytro ILLum | 36.81 | 0.9585 |
| | Mix | 35.73 | 0.9527 |

This is due to the fact that most current networks simply take one aspect of the super-resolution of the light field picture into consideration. According to the method for light field picture processing provided in this application, since the super-resolution reconstruction net used on the decoding end can simultaneously improve the resolutions of the light field picture on spatial and angular dimensions, the EPI-SREH-Net provided based on this application has obvious effect improvement on the super-resolution of the light field picture.

That is to say, in this application, by means of applying the method for light field picture processing provided in this application to a low-code rate light field compression solution of the SAI, the encoding performance of the light field picture can be obviously improved. By using the Lytro Ilium light field dataset as an example, a whole light field picture is encoded and transmitted. Before the low-code rate light field compression solution is used, the light field picture encoder needs to encode a 64-frame MOP pseudo-sequence. After the low-code rate light field compression solution is used, only a 16-frame 270P pseudo-sequence is required to be encoded, so that the encoding efficiency can be greatly enhanced, and the transmitted bitstream can be reduced.

To sum up, the embodiments of this application provide a light field SAI-based, end-to-end low-code rate light field picture compression solution. The solution may mainly include the pre-processing of the light field picture, the encoding of light field picture data, bitstream transmission, the decoding of the light field picture data and the post-processing of the light field picture. During a specific implementation, the solution may mainly include the construction of a low-resolution SAI pseudo-sequence, the encoding and decoding of the low-resolution SAI pseudo-sequence, and the super-resolution reconstruction of a decoded low-resolution SAI.

Further, in this application, an EPI thought-based network structure used for the spatial and angular super-resolution reconstruction of the light field picture is designed. The super-resolution reconstruction net entirely uses a branch-fusion structure, which may effectively perform spatial and angular super-resolution reconstruction on the low-resolution SAI. Meanwhile, a QENet Enhance-net is also designed, which is configured to enhance the picture quality of the reconstructed SAI outputted by the super-resolution reconstruction net. Experimental data shows that, the method for light field picture processing provided in this application has an obvious improvement effect on the super-resolution of the light field picture on the decoding end by means of the super-resolution reconstruction net, so that the transmission data size can be reduced by means of performing down-sampling processing of the spatial resolution and the angular resolution on the encoding end.

This embodiment provides the method for light field picture processing. The light field picture decoder parses the bitstream, so as to obtain the initial SAI; the initial SAI is inputted into the super-resolution reconstruction net, and the reconstructed SAI is outputted, where the spatial resolution and the angular resolution of the reconstructed SAI are both greater than the spatial resolution and the angular resolution of the initial SAI; and the reconstructed SAI is inputted into the QENet, and the target SAI is outputted. The light field picture encoder obtains the lenslet image through collection by means of the light field camera, and an SAI is generated according to the lenslet image; down-sampling processing is performed on the SAI, so as to obtain the initial SAI; the picture pseudo-sequence corresponding to the SAI is generated on the basis of a preset arrangement order and the initial SAI; and encoding processing is performed on the basis of the picture pseudo-sequence, so as to generate the bitstream. That is to say, in the embodiments of this application, since the super-resolution reconstruction net may be used on a decoding end to perform spatial and angular super-resolution reconstruction on a low-resolution SAI, down-sampling processing may be used on an encoding end to reduce the spatial resolution and the angular resolution of the SAI, so that encoding and decoding processing may be performed on only partial light field picture. Therefore, the transmitted bitstream data can be effectively reduced, and encoding and decoding efficiency can be greatly enhanced, thereby enhancing the compression efficiency of the light field picture. Therefore, in this application, the design of the super-resolution reconstruction net is used, so that the spatial resolution and the angular resolution of the light field picture can be simultaneously improved. In this way, when the super-resolution reconstruction net is applied to the processing process of light field compression, the efficiency of compression processing can be obviously improved. Meanwhile, in this application, the QENet may also be used to improve the picture quality of a result outputted by the super-resolution reconstruction net, so that the picture quality can be improved.

Figure 21:
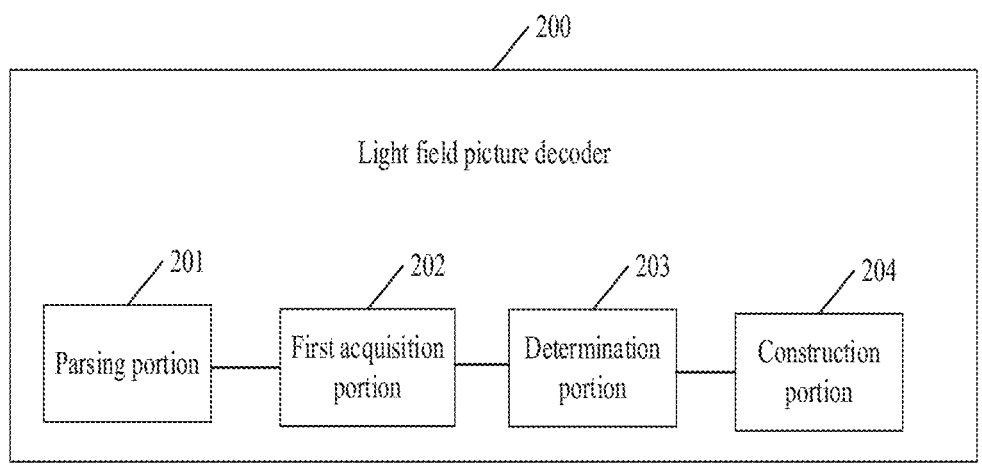
FIG. 21 is a schematic diagram I of a composition structure of a light field picture decoder.

On the basis of the above embodiments, in another embodiment of this application, FIG. 21 is a schematic diagram I of a composition structure of a light field picture decoder. As shown in FIG. 21, the light field picture decoder 200 provided in the embodiments of this application may include a parsing portion 201, a first acquisition portion 202, a determination portion 203 and a construction portion 204.

The parsing portion 201 is configured to parse a bitstream to obtain an initial SAI.

The first acquisition portion 202 is configured to input the initial SAI into a super-resolution reconstruction net, and output a reconstructed SAI, where the spatial resolution and the angular resolution of the reconstructed SAI are both greater than the spatial resolution and the angular resolution of the initial SAI; and input the reconstructed SAI into a QENet, and output a target SAI.

Further, in the embodiments of this application, the parsing portion 201 is specifically configured to: parse the bitstream to obtain a picture pseudo-sequence and a preset arrangement order; and generate the initial SAI based on the preset arrangement order and the picture pseudo-sequence.

Further, in the embodiments of this application, the first acquisition portion 202 is specifically configured to: perform extraction processing based on the initial SAI to obtain an initial EPI set; perform up-sampling processing and feature extraction on the initial EPI set to obtain a target EPI set, where the resolution of a picture in the target EPI set is greater than the resolution of a picture in the initial EPI set; and perform fusion processing on the target EPI set to obtain the reconstructed SAI.

Further, in the embodiments of this application, the first acquisition portion 202 is further specifically configured to: perform sort processing on the initial SAI to obtain a stereo image set; and perform extraction processing on the stereo picture set according to at least one direction to obtain at least one initial EPI set. One direction corresponds to one initial EPI set.

Further, in the embodiments of this application, the first acquisition portion 202 is further specifically configured to: parse the bitstream to obtain a sampling parameter; perform up-sampling processing on the EPI set according to the sampling parameter to obtain a sampled EPI set; use one or more convolution layers to perform feature extraction on the sampled EPI set to obtain a feature picture corresponding to the initial EPI set; and construct the target EPI set based on the sampled EPI set and the feature picture.

Further, in the embodiments of this application, the first acquisition portion 202 is further specifically configured to: perform weighted average fusion on at least one target EPI set corresponding to at least one EPI set to obtain the reconstructed SAI.

Further, in this embodiment of this application, the determination portion 203 is configured to determine a first network parameter corresponding to the super-resolution reconstruction net.

The construction portion 204 is configured to construct the super-resolution reconstruction net based on the first network parameter.

Further, in the embodiments of this application, the determination portion 203 is specifically configured to: acquire first training data, where the first training data includes a low-resolution picture and a corresponding high-resolution picture; and perform model training through the first training data to determine the first network parameter.

Further, in the embodiments of this application, the determination portion 203 is specifically configured to parse the bitstream to obtain the first network parameter.

Further, in the embodiments of this application, the determination portion 203 is specifically configured to determine a second network parameter corresponding to the QENet.

The construction portion 204 is further configured to construct the QENet based on the second network parameter.

Further, in the embodiments of this application, the determination portion 203 is further configured to: acquire second training data, where the second training data includes a low-quality picture and a corresponding high-quality picture; and perform model training through the second training data to determine the second network parameter.

Further, in this embodiment of this application, the determination portion 203 is further configured to parse the bitstream to obtain the second network parameter.

Figure 22:
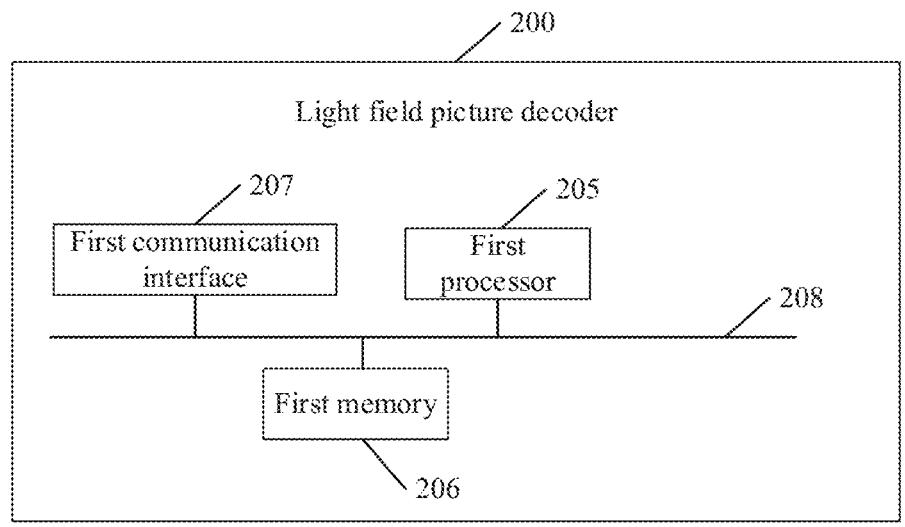
FIG. 22 is a schematic diagram II of a composition structure of a light field picture decoder.

FIG. 22 is a schematic diagram II of a composition structure of a light field picture decoder. As shown in FIG. 22, the light field picture decoder 200 provided in the embodiments of this application may further include a first processor 205, a first memory 206 that stores instructions executable by the first processor 205, a first communication interface 207, and a first bus 208 used to connect the first processor 205, the first memory 206 and the first communication interface 207.

Further, in the embodiments of this application, the first processor 205 is configured to: parse a bitstream to obtain an initial SAI; input the initial SAI into a super-resolution reconstruction net, and output a reconstructed SAI, where the spatial resolution and the angular resolution of the reconstructed SAI are both greater than the spatial resolution and the angular resolution of the initial SAI; and input the reconstructed SAI into a QENet, and output a target SAI.

In addition, the functional modules in the embodiments may be integrated into one processing unit, or each unit may exist alone physically, or two or more than two units may be integrated into one unit. The above integrated unit can be implemented in the form of hardware, or can be implemented in the form of a software functional module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the steps of the method in the embodiment. The storage medium includes: various media capable of storing program codes such as a U disk, a mobile Hard Disk Drive (HDD), a Read-Only Memory (ROM), a Random Access Memory (RAM), a magnetic disk or an optical disk.

Embodiments of this application provide a light field picture decoder. The light field picture decoder parses the bitstream, so as to obtain the initial SAI; the initial SAI is inputted into the super-resolution reconstruction net, and the reconstructed SAI is outputted, where the spatial resolution and the angular resolution of the reconstructed SAI are both greater than the spatial resolution and the angular resolution of the initial SAI; and the reconstructed SAI is inputted into the QENet, and the target SAI is outputted. That is to say, in the embodiments of this application, since the super-resolution reconstruction net may be used on a decoding end to perform spatial and angular super-resolution reconstruction on a low-resolution SAI, down-sampling processing may be used on an encoding end to reduce the spatial resolution and the angular resolution of the SAI, so that encoding and decoding processing may be performed on only partial light field picture. Therefore, transmitted bitstream data can be effectively reduced, and encoding and decoding efficiency can be greatly enhanced, thereby enhancing the compression efficiency of the light field picture. Therefore, in this application, the design of the super-resolution reconstruction net is used, so that the spatial resolution and the angular resolution of the light field picture can be simultaneously improved. In this way, when the super-resolution reconstruction network is applied to the processing process of light field compression, the efficiency of compression processing can be obviously improved. In addition, in this application, the QENet may also be used to improve the picture quality of a result outputted by the super-resolution reconstruction network, so that the picture quality can be improved.

Figure 23:
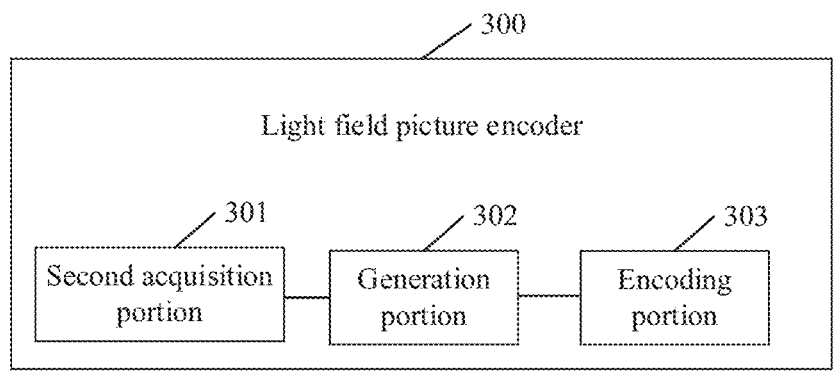
FIG. 23 is a schematic diagram I of a composition structure of a light field picture encoder.

On the basis of the above embodiments, in still another embodiment of this application, FIG. 23 is a schematic diagram I of a composition structure of a light field picture encoder. As shown in FIG. 23, the light field picture encoder 300 provided in the embodiments of this application includes a second acquisition portion 301, a generation portion 302 and an encoding portion 303.

The second acquisition portion 301 is configured to collect a lenslet image by a light field camera.

The generation portion 302 is configured to generate a SAI according to the lenslet image.

The second acquisition portion 301 is further configured to perform down-sampling processing on the SAI to obtain an initial SAI.

The generation portion 302 is further configured to, generate a picture pseudo-sequence corresponding to the SAI based on a preset arrangement order and the initial SAI; and perform encoding processing based on the picture pseudo-sequence to generate a bitstream.

Further, in the embodiments of this application, the encoding portion 303 is configured to, after the picture pseudo-sequence corresponding to the SAI is generated based on the preset arrangement order and the initial SAI, signal a sort parameter in the bitstream. The sort parameter is used for indicating the preset arrangement order.

Further, in the embodiments of this application, the second acquisition portion 301 is configured to, respectively perform down-sampling processing on the spatial resolution and the angular resolution of the SAI according to a sampling parameter to complete the construction of the initial SAI.

Further, in the embodiments of this application, the encoding portion 303 is configured to, after down-sampling processing is performed on the SAI to obtain the initial SAI, signal the sampling parameter in the bitstream.

Figure 24:
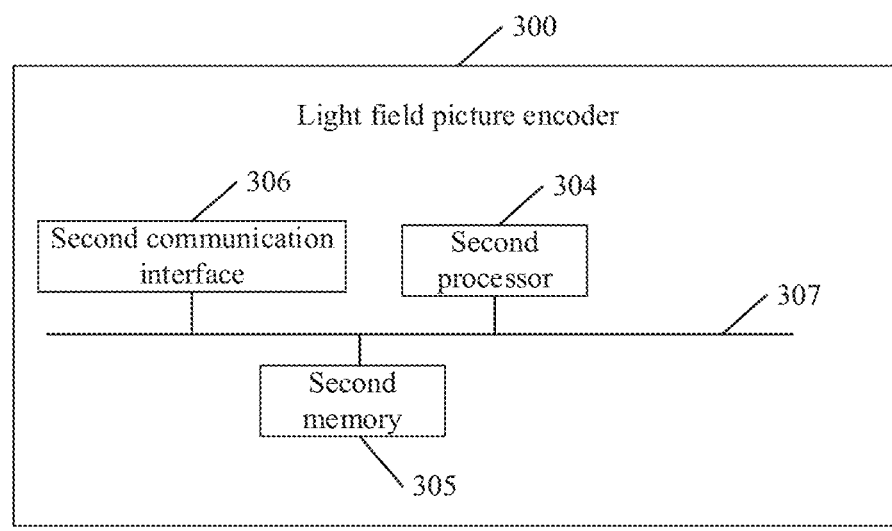
FIG. 24 is a schematic diagram II of a composition structure of a light field picture encoder.

FIG. 24 is a schematic diagram II of a composition structure of a light field picture encoder. As shown in FIG. 24, the light field picture encoder 300 provided in the embodiments of this application may further include a second processor 304, a second memory 305 that stores instructions executable by the first processor 304, a second communication interface 306, and a second bus 307 used to connect the second processor 304, the second memory 305 and the second communication interface 306.

Further, in the embodiments of this application, the second processor 304 is configured to: obtain a lenslet image through collection by a light field camera, and generate, according to the lenslet image, an SAI; perform down-sampling processing on the SAI to obtain an initial SAI; generate a picture pseudo-sequence corresponding to the SAI based on a preset arrangement order and the initial SAI; and perform encoding processing based on the picture pseudo-sequence to generate a bitstream.

In addition, the functional modules in the embodiments may be integrated into one processing unit, or each unit may exist alone physically, or two or more than two units may be integrated into one unit. The above integrated unit can be implemented in the form of hardware, or can be implemented in the form of a software functional module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the steps of the method in the embodiment. The storage medium includes: various media capable of storing program codes such as a U disk, a mobile Hard Disk Drive (HDD), a Read-Only Memory (ROM), a Random Access Memory (RAM), a magnetic disk or an optical disk.

Embodiments of this application provide a light field picture encoder. The light field picture encoder obtains the lenslet image through collection by the light field camera, and an SAI is generated according to the lenslet image; down-sampling processing is performed on the SAI to obtain the initial SAI; the picture pseudo-sequence corresponding to the SAI is generated based on a preset arrangement order and the initial SAI; and encoding processing is performed based on the picture pseudo-sequence to generate the bitstream. That is to say, in the embodiments of this application, since the super-resolution reconstruction net may be used on a decoding end to perform spatial and angular super-resolution reconstruction on a low-resolution SAI, down-sampling processing may be used on an encoding end to reduce the spatial resolution and the angular resolution of the SAI, so that encoding and decoding processing may be performed on only partial light field picture. Therefore, transmitted bitstream data can be effectively reduced, and encoding and decoding efficiency can be greatly enhanced, thereby enhancing the compression efficiency of the light field picture. Therefore, in this application, the design of the super-resolution reconstruction net is used, so that the spatial resolution and the angular resolution of the light field picture can be simultaneously improved. In this way, when the super-resolution reconstruction net is applied to the processing process of light field compression, the efficiency of compression processing can be obviously improved. In addition, in this application, the QENet may also be used to improve the picture quality of a result outputted by the super-resolution reconstruction net, so that the picture quality can be improved.

Embodiments of this application provide a computer-readable storage medium. The computer-readable storage medium stores a program. The method described in the above embodiments is implemented when the program is executed by a processor.

Specifically, program instructions corresponding to the method for light field picture processing in the embodiments may be stored in a storage medium such as an optical disk, an HDD and a U disk. When the program instructions corresponding to the method for light field picture processing in the storage medium is read or executed by an electronic device, the following operations are included.

A bitstream is parsed to obtain an initial SAI.

The initial SAI is inputted into a super-resolution reconstruction net, and a reconstructed SAI is outputted. The spatial resolution and the angular resolution of the reconstructed SAI are both greater than the spatial resolution and the angular resolution of the initial SAI.

The reconstructed SAI is inputted into a Quality Enhancement Net (QENet), and a target SAI is outputted.

Specifically, program instructions corresponding to the method for light field picture processing in the embodiments may be stored in a storage medium such as an optical disk, an HDD and a U disk. When the program instructions corresponding to the method for light field picture processing in the storage medium is read or executed by an electronic device, the following operations are further included.

A lenslet image is obtained through collection by a light field camera, and an SAI is generated according to the lenslet image.

Down-sampling processing is performed on the SAI to obtain an initial SAI.

Based on a preset arrangement order and the initial SAI, a picture pseudo-sequence corresponding to the SAI is generated.

Encoding processing is performed based on the picture pseudo-sequence to generate a bitstream.

Persons skilled in the art should understand that the embodiments of this application may be provided as a method, a system, or a computer program product. Therefore, this application may adopt forms of hardware embodiments, software embodiments or embodiments integrating software and hardware. Moreover, this application may adopt the form of a computer program product implemented on one or more computer available storage media (including but being not limited to a disk memory, an optical memory, and the like) containing computer available program codes.

This application is described with reference to schematic diagrams of implementation processes and/or block diagrams of the method, the device (system) and the computer program product according to the embodiments of this application. It should be understood that each flow and/or block in the schematic diagram of implementation process and/or block diagram, and the combination of the flow and/or block in the schematic diagram of implementation process and/or block diagram can be implemented by the computer program instructions. These computer program instructions can be provided to a processor of a general-purpose computer, a special-purpose computer, an embedded processor or other programmable data processing devices to generate a machine, so that instructions which are executed by the processor of the computer or other programmable data processing devices generate a device which is used for implementing the specified functions in one or more flows of the schematic diagram of implementation process and/or one or more blocks of the block diagram.

These computer program instructions may also be stored in the computer-readable memory which can guide the computer or other programmable data processing devices to work in a particular way, so that the instructions stored in the computer-readable memory generate a product including an instruction device. The instruction device implements the specified functions in one or more flows of the schematic diagram of implementation process and/or one or more blocks of the block diagram.

These computer program instructions may also be loaded on the computer or other programmable data processing devices, so that a series of operation steps are performed on the computer or other programmable data processing devices to generate the processing implemented by the computer, and the instructions executed on the computer or other programmable data processing devices provide the steps for implementing the specified functions in one or more flows of the schematic diagram of implementation process and/or one or more blocks of the block diagram.

The above descriptions are merely preferred embodiments of this application, and are not intended to limit the protection scope of the present application.

INDUSTRIAL APPLICABILITY

The embodiments of this application provide the method for light field picture processing, the light field picture encoder and decoder, and the storage medium. The light field picture decoder parses the bitstream to obtain the initial SAI; the initial SAI is inputted into the super-resolution reconstruction net, and the reconstructed SAI is outputted, where the spatial resolution and the angular resolution of the reconstructed SAI are both greater than the spatial resolution and the angular resolution of the initial SAI; and the reconstructed SAI is inputted into the QENet, and the target SAI is outputted. The light field picture encoder obtains the lenslet image through collection by the light field camera, and an SAI is generated according to the micro-lens image; down-sampling processing is performed on the SAI to obtain the initial SAI; the picture pseudo-sequence corresponding to the SAI is generated based on a preset arrangement order and the initial SAI; and encoding processing is performed based on the picture pseudo-sequence to generate the bitstream. That is to say, in the embodiments of this application, since the super-resolution reconstruction net may be used on a decoding end to perform spatial and angular super-resolution reconstruction on a low-resolution SAI, down-sampling processing may be used on an encoding end to reduce the spatial resolution and the angular resolution of the SAI, so that encoding and decoding processing may be performed on only partial light field picture. Therefore, transmitted bitstream data can be effectively reduced, and encoding and decoding efficiency can be greatly enhanced, thereby enhancing the compression efficiency of the light field picture. Therefore, in this application, the design of the super-resolution reconstruction net is used, so that the spatial resolution and the angular resolution of the light field picture can be simultaneously improved. In this way, when the super-resolution reconstruction net is applied to the processing process of light field compression, the efficiency of compression processing can be obviously improved. In addition, in this application, the QENet may also be used to improve the picture quality of a result outputted by the super-resolution reconstruction net, so that the picture quality can be improved. To sum up, in this application, before the light field picture encoder compresses and encodes the light field picture, spatial and angular down-sampling processing may be performed on the light field picture, so as to obtain the low-resolution light field picture, so that a data size to be encoded can be reduced. Accordingly, after decoding, the light field picture decoder may use the super-resolution reconstruction net to perform spatial and angular up-sampling processing on the low-resolution light field picture, so as to construct the high-resolution light field picture. Therefore, transmitted bitstreams can be reduced, thereby greatly enhancing the encoding and decoding efficiency.

The invention claimed is:

1. A method for light field picture processing, applied to a light field picture decoder and comprising:
    parsing a bitstream to obtain an initial Sub Aperture Image (SAI);
    inputting the initial SAI into a super-resolution reconstruction net, and outputting a reconstructed SAI, wherein the spatial resolution and the angular resolution of the reconstructed SAI are both greater than the spatial resolution and the angular resolution of the initial SAI; and
    inputting the reconstructed SAI into a Quality Enhancement Net (QENet), and outputting a target SAI;
    wherein the parsing a bitstream to obtain an initial SAI comprises:
    parsing the bitstream to obtain a picture pseudo-sequence and a preset arrangement order, wherein the preset arrangement order is any one of a rotation order, a raster scanning order, and a zigzag-shaped canning order; and
    generating the initial SAI based on the preset arrangement order and the picture pseudo-sequence.

2. The method of claim 1, wherein the inputting the initial SAI into a super-resolution reconstruction net, and outputting a reconstructed SAI comprises:
performing extraction processing based on the initial SAI to obtain an initial Epipolar Plane Image (EPI) set;
performing up-sampling processing and feature extraction on the initial EPI set to obtain a target EPI set, wherein a resolution of a picture in the target EPI set is greater than a resolution of a picture in the initial EPI set; and
performing fusion processing on the target EPI set to obtain the reconstructed SAI.

3. The method of claim 2, wherein the performing extraction processing based on the initial SAI to obtain an initial EPI set comprises:
performing sort processing on the initial SAI to obtain a stereo picture set; and
performing extraction processing on the stereo picture set according to at least one direction to obtain at least one initial EPI set, wherein one direction corresponds to one initial EPI set.

4. The method of claim 3, wherein the performing fusion processing on the target EPI set to obtain the reconstructed SAI comprises:
performing weighted average fusion on at least one target EPI set corresponding to at least one EPI set to obtain the reconstructed SAI.

5. The method of claim 2, wherein the performing up-sampling processing and feature extraction on the initial EPI set to obtain a target EPI set comprises:
parsing the bitstream to obtain a sampling parameter;
performing up-sampling processing on the EPI set according to the sampling parameter to obtain a sampled EPI set;
using one or more convolution layers to perform feature extraction on the sampled EPI set to obtain a feature picture corresponding to the initial EPI set; and
constructing the target EPI set based on the sampled EPI set and the feature picture.

6. The method of claim 1, further comprising:
determining a first network parameter corresponding to the super-resolution reconstruction net; and
constructing the super-resolution reconstruction net based on the first network parameter.

7. The method of claim 6, wherein the determining a first network parameter corresponding to the super-resolution reconstruction net comprises:
acquiring first training data, wherein the first training data comprises a low-resolution picture and a corresponding high-resolution picture; and
performing model training through the first training data to determine the first network parameter.

8. The method of claim 6, wherein the determining a first network parameter corresponding to the super-resolution reconstruction net comprises:
parsing the bitstream to obtain the first network parameter.

9. The method of claim 1, further comprising:
determining a second network parameter corresponding to the QENet; and
constructing the QENet based on the second network parameter.

10. The method of claim 9, wherein the determining a second network parameter corresponding to the QENet comprises:
acquiring second training data, wherein the second training data comprises a low-quality picture and a corresponding high-quality picture; and
performing model training through the second training data to determine the second network parameter.

11. The method of claim 9, wherein the determining a second network parameter corresponding to the QENet comprises:
parsing the bitstream to obtain the second network parameter.

12. A method for light field picture processing, applied to a light field picture encoder and comprising:
obtaining a lenslet image through collection by a light field camera, and generating a Sub Aperture Image (SAI) according to the lenslet image;
performing down-sampling processing on the SAI to obtain an initial SAI;
generating a picture pseudo-sequence corresponding to the SAI based on a preset arrangement order and the initial SAI, wherein the preset arrangement order is any one of a rotation order, a raster scanning order, and a zigzag-shaped canning order; and
performing encoding processing based on the picture pseudo-sequence to generate a bitstream.

13. The method of claim 12, wherein after the generating a picture pseudo-sequence corresponding to the SAI based on a preset arrangement order and the initial SAI, the method further comprises:
signaling a sort parameter in the bitstream, wherein the sort parameter is used for indicating the preset arrangement order.

14. The method of claim 12, wherein the performing down-sampling processing on the SAI to obtain an initial SAI comprises:
respectively performing, according to a sampling parameter, down-sampling processing on a spatial resolution and an angular resolution of the SAI to complete the construction of the initial SAI.

15. The method of claim 14, wherein after the performing down-sampling processing on the SAI to obtain an initial SAI, the method further comprises:
signaling the sampling parameter in the bitstream.

16. A light field picture decoder, comprising a first processor, and a first memory that stores instructions executable by the first processor, wherein, when the instructions are executed by the first processor, the first processor is configured to:
parse a bitstream to obtain an initial Sub Aperture Image (SAI);
input the initial SAI into a super-resolution reconstruction net, and outputting a reconstructed SAI, wherein the spatial resolution and the angular resolution of the reconstructed SAI are both greater than the spatial resolution and the angular resolution of the initial SAI; and
input the reconstructed SAI into a Quality Enhancement Net (QENet), and output a target SAI;
wherein first processor is further configured to:
parse the bitstream to obtain a picture pseudo-sequence and a preset arrangement order, wherein the preset arrangement order is any one of a rotation order, a raster scanning order, and a zigzag-shaped canning order; and
generate the initial SAI based on the preset arrangement order and the picture pseudo-sequence.

17. A light field picture encoder, comprising a second processor, and a second memory that stores instructions executable by the second processor, wherein, when the instructions are executed by the second processor, the second processor is configured to:

obtain a lenslet image through collection by a light field camera, and generating a Sub Aperture Image (SAI) according to the lenslet image;

perform down-sampling processing on the SAI to obtain an initial SAI;

generate a picture pseudo-sequence corresponding to the SAI based on a preset arrangement order and the initial SAI, wherein the preset arrangement order is any one of a rotation order, a raster scanning order, and a zigzag-shaped canning order; and perform encoding processing based on the picture pseudo-sequence to generate a bitstream.

18. The light field picture encoder of claim 17, wherein the second processor is further configured to:

signal a sort parameter in the bitstream, wherein the sort parameter is used for indicating the preset arrangement order.

* * * * *